United States Patent [19]
Rosen

[11] Patent Number: 5,671,280
[45] Date of Patent: Sep. 23, 1997

[54] SYSTEM AND METHOD FOR COMMERCIAL PAYMENTS USING TRUSTED AGENTS

[75] Inventor: Sholom S. Rosen, New York, N.Y.

[73] Assignee: Citibank, N.A., New York, N.Y.

[21] Appl. No.: 521,262

[22] Filed: Aug. 30, 1995

[51] Int. Cl.$^6$ ........................................................ H04L 9/00
[52] U.S. Cl. ............................................................ 380/24
[58] Field of Search ........................................ 380/24, 30

[56] References Cited

U.S. PATENT DOCUMENTS

| | | | |
|---|---|---|---|
| 4,038,525 | 7/1977 | Freeman | 377/111 |
| 4,443,027 | 4/1984 | McNeely et al. | |
| 4,454,414 | 6/1984 | Benton | |
| 4,529,870 | 7/1985 | Chaum | |
| 4,644,493 | 2/1987 | Chandra et al. | 380/22 |
| 4,817,140 | 3/1989 | Chandra et al. | 380/25 |
| 4,916,738 | 4/1990 | Chandra et al. | 380/25 |
| 4,926,325 | 5/1990 | Benton et al. | |
| 4,926,480 | 5/1990 | Chaum | 380/24 |
| 4,972,175 | 11/1990 | MacPherson | |
| 4,999,806 | 3/1991 | Chernow et al. | 380/25 |
| 5,109,413 | 4/1992 | Comerford et al. | 380/4 |
| 5,117,457 | 5/1992 | Comerford et al. | 380/4 |
| 5,131,039 | 7/1992 | Chaum | 380/25 |
| 5,148,534 | 9/1992 | Comerford | 380/4 |
| 5,162,989 | 11/1992 | Matsuda | |
| 5,185,717 | 2/1993 | Mori | |
| 5,202,921 | 4/1993 | Herzberg et al. | 380/25 |
| 5,247,578 | 9/1993 | Pailles et al. | 380/24 |
| 5,276,311 | 1/1994 | Hennige | |
| 5,276,736 | 1/1994 | Chaum | 380/24 |
| 5,319,705 | 6/1994 | Halter et al. | 380/25 |
| 5,416,840 | 5/1995 | Cane et al. | 380/25 |
| 5,519,778 | 5/1996 | Leighton et al. | 380/30 |
| 5,557,518 | 9/1996 | Rosen | 380/24 |

FOREIGN PATENT DOCUMENTS

| | | |
|---|---|---|
| 0172670A2 | 2/1986 | European Pat. Off. |
| 419106A1 | 3/1991 | European Pat. Off. |
| A 0 421 808 | 4/1991 | European Pat. Off. |
| 474360A2 | 3/1992 | European Pat. Off. |
| A 0 172 670 | 2/1993 | European Pat. Off. |
| 0569816A2 | 11/1993 | European Pat. Off. |
| 0380377B1 | 10/1994 | European Pat. Off. |
| 2257557 | 1/1993 | United Kingdom |
| A 93 08545 | 4/1993 | WIPO |
| WO9308545 | 4/1993 | WIPO |
| A 93 10503 | 5/1993 | WIPO |
| WO9401825 | 1/1994 | WIPO |
| WO9512859 | 5/1995 | WIPO |

OTHER PUBLICATIONS

"Le paiement électronique", P. Rémery, J.C. Pailles and F. Lay, *L'Echo des Recherches*, No. 134, 4$^e$ trimester 1988—original French version and English translation.

"Online Cash Checks", David Chaum, *Scientific Publications OnLine: david@digicash.nl*.

"Achieving Electronic Privacy", David Chaum, *Scientific American*, Aug. 1992, pp. 96–101.

"Value Exchange Systems Enabling Security and Unobservability", Holger Bürk and Andreas Pfitzmann, *Computers and Security*, 9 (1990) pp. 715–721.

(List continued on next page.)

*Primary Examiner*—Salvatore Cangialosi
*Attorney, Agent, or Firm*—Morgan & Finnegan

[57] ABSTRACT

A system for electronic commercial payment is provided having a customer trusted agent associated with a first money module, a merchant trusted agent that establishes a first cryptographically secure session with the customer trusted agent and associated with a second money module. Where the money modules establish a second cryptographically secure session. The customer trusted agent provides remittance advice information to the merchant trusted agent, and the merchant trusted agent provides a commercial payment ticket to the customer trusted agent. Upon receiving said commercial payment ticket, the customer trusted agent initiates a transfer of electronic money from the first money module to the second money module.

16 Claims, 39 Drawing Sheets

OTHER PUBLICATIONS

"Proxy-Based Authorization and Accounting for Distributed Systems", B. Clifford Neuman, *Proceedings of the 13th International Conference on Distributed Computing Systems,* Pittsburgh, May 1993.

"ABYSS: A Trusted Architecture for Software Protection", S.R. White and L. Comerford, *IEEE* 1987.

"Public Protection of Software", A. Herzberg and S.S. Pinter, *ACM Transactions on Computer Systems,* vol. 5, No. 4, Nov. 1987, pp. 371-393.

"Security Without Identification: Card Computers To Make Big Brother Obsolete", D. Chaum, 1987.

"Trust in the New Information Age", D.P. Maher, *AT&T Technical Journal,* Sep./Oct. 1994, pp. 9-16.

"Dyad: A System for Using Physically Secure Coprocessors", J.D. Tygar and B. Yee.

"Trusted Devices as applied to Corporate Key Escrow", F. Sudia, Jan. 14, 1994.

"WaveMeter Chip Provides Digital Money", M. Slater, *Microprocessor Report,* Apr. 18, 1994.

"Internet Billing Service Design and Prototype Implementation", Marvin A. Sirbu, *IMA Intellectual Property Project Proceedings,* vol. 1, Issue 1, Jan. 1994.

Trusted Agent/Money Module Interaction

Remittance Advice

Invoice

| INVOICE NUMBER | PURCHASE ORDER NUMBER | DUE DATE | AMOUNT OF INVOICE | AMOUNT OF DISCOUNT | NET AMOUNT |
|---|---|---|---|---|---|
| 52 | 53 | 54 | 55 | 56 | |

51

Trusted Agent Components

Configuration for Commercial Money Module Payment

Commit

Abort

Commercial Money Module Payment (Cont.)

Commercial Money Module Payment (Cont.)

Establish Session (Cont.)

Establish Session (Cont.)

Check Credential

Abort Transaction

Message Encryption Layers

Establish Session (MM) (Cont.)

Establish Session (MM) (Cont.)

Send MM/TA Message

Abort Transaction (MM) (Cont)

SYSTEM AND METHOD FOR COMMERCIAL PAYMENTS USING TRUSTED AGENTS

FIELD OF THE INVENTION

The present invention relates to a system for facilitating electronic commercial payments without third party intermediaries. In particular, the system utilizes tamper-proof electronic units, referred to as "trusted agents", in combination with money modules to create a secure transaction environment for handling commercial payments and the accompanying remittance information.

BACKGROUND OF THE INVENTION

Numerous electronic payment systems are currently being developed to accommodate the growth in electronic commerce. One method of electronic payment is described in my co-pending U.S. patent application Ser. Nos. 07/794,112 filed Nov. 15, 1991, now U.S. Pat. No. 5,453,601, 08/234,461 filed Apr. 28, 1994, now U.S. Pat. No. 5,557,518, and 08/427,287 filed Apr. 21, 1995, pending, the disclosures of which are incorporated herein by reference. These applications disclose an electronic monetary system for implementing electronic money payments as an alternative medium of exchange to cash, checks, credit cards, debit cards, and electronic funds transfers. In particular, the described system uses money modules packaged in tamper-proof housings to store and transfer electronic notes. Money module payments may be either real-time, off-line payments between money modules (e.g., between a money module contained within a customer's "electronic wallet" and a money module contained within a merchant's point-of-sale terminal), or on-line payments for network services such as information retrieval and telephone calls, or for purchasing airline tickets, theater tickets, etc.

The trusted agents discussed herein are fully described in my co-pending U.S. patent application Ser. No. 08/234,461, filed Apr. 28, 1994, the disclosure of which is incorporated herein by reference. That application describes a system for enabling the secure delivery of electronic merchandise with real-time anonymous payment or authorization-based payment. The system allows both the customer and merchant to feel secure that their interests are being served.

Commercial payments are mostly made by check, but increasingly there is a move to electronic funds transfer (EFT). A commercial payment, whether by check or EFT, carries a remittance advice that allows the payee to apply the payment to the customer's outstanding invoice(s). It is important to match the payment with the remittance advice so that both the payer and payee can prove their case if there is a dispute.

In the case of a check payment, the remittance advice is normally printed with the check. Check payments are costly to both the payer and payee. The payer has to print, mail, and reconcile the checks, and the payee has to open the mail, rekey the information, and wait for the check to clear. Because of these inefficiencies, intermediaries offering disbursement and lock box services are being used more and more.

There is also a movement to EFT since this will lower the cost to both payer and payee. Currently, EFT payments are less than five percent of commercial payments. One of the impediments to expanding EFT is the need for a bank to intermediate the transaction. Processing is limited to the availability of the bank's systems, and cannot be used if the payer's bank and payee's bank do not have an EFT arrangement. The EFT system must be capable of transmitting the remittance advice with the payment message so that payment information can be matched to the payment. EFT needs fixed relationships among banks and payers and payees. It locks the parties into relationships which are difficult to rework.

The present invention describes a system that allows commercial payments to be done securely and electronically between payer and payee without the need for intermediaries and that matches the payment and remittance advice. The transaction can be accomplished at the convenience of the parties and provides proof of payment to the payer and payee in case of a dispute.

SUMMARY OF THE INVENTION

It is an object of the present invention to provide a secure system using trusted agents that enables electronic commercial payments from payer to payee without any intermediaries.

It is a further object of the present invention to provide a payment system that marries the payment information with the payment so that the payment is final and there is no need to match the payment information to the actual payment after the payment is made.

It is yet a further object of the present invention to provide a payment system where the payment information is electronically signed by the payee's trusted agent so that the payee cannot repudiate that he has been paid.

In the present invention, a payment system is provided having a customer trusted agent, a first money module associated with the customer trusted agent and with which it securely communicates, a merchant trusted agent that establishes a first cryptographically secure session with the customer trusted agent, and a second money module associated with the merchant trusted agent with which it securely communicates. The first and second money modules establish a second cryptographically secure session. The customer trusted agent provides remittance advice information to the merchant trusted agent, and the merchant trusted agent provides a commercial payment ticket to said customer trusted agent. Upon receiving the commercial payment ticket, the customer trusted agent initiates a transfer of electronic money from the first money module to the second money module.

The commercial payment ticket preferably contains the merchant trusted agent's digital signature over the remittance information. The customer trusted agent then verifies the digital signature prior to initiating an electronic money payment.

DESCRIPTION OF THE DRAWINGS

The invention will be described in greater detail below with reference to the attached drawings, of which.

DESCRIPTION OF THE PREFERRED EMBODIMENT

As described in my co-pending U.S. application Ser. No. 08/234,461, a trusted agent is a combination of hardware and software components. It is tamper-proof and contains secure protocols which cooperate with a money module to synchronize secure payment to delivery. Money modules are tamper-proof devices capable of storing and transferring electronic money. The electronic money is preferably in the form of electronic: notes that are representations of currency or credit. Money modules are also capable of establishing cryptographically secure communication sessions with other devices. The preferred embodiment of the present invention utilizes the transaction money modules described in my co-pending U.S. patent applications Ser. Nos. 07/794,112 and 08/427,287.

Figure 1:
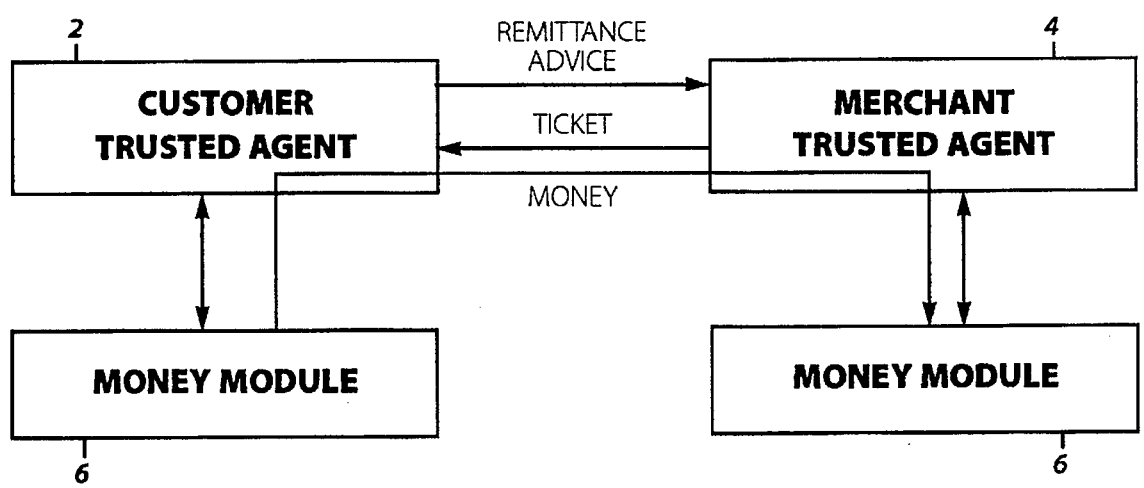
FIG. 1 is a diagram showing the trusted agent/money module interaction.

The trusted agents when making purchases over a network, exchange electronic merchandise and payment. In the present invention for making commercial payments, as shown in FIG. 1, the customer's trusted agent 2 (CTA) sends remittance advice information to the merchant's trusted agent 4 (MTA). The merchant's trusted agent 4 then sends a commercial payment ticket to the customer's trusted agent 2. In return, the customer's money module 6 sends electronic money to the merchant's money module 6 via CTA 2 and MTA 4.

Remittance Advice

Figures 2A, 2B:
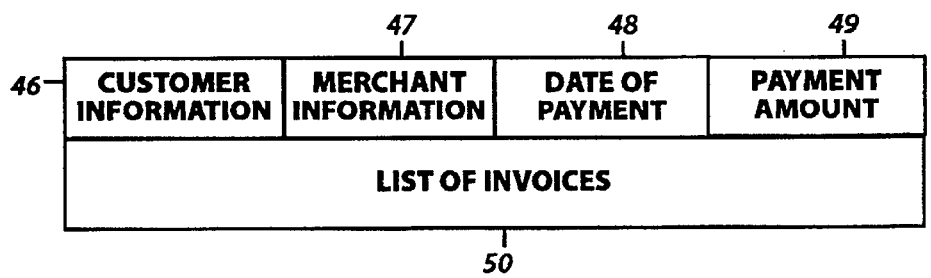
FIGS. 2A–2B illustrate the data included in a Remittance Advice created by a customer's accounts payable system.

The customer's accounts payable system creates a remittance advice to be paid by a customer trusted device. The remittance advice is sent to the trusted device over the customer network. As shown in FIG. 2A, the remittance advice contains information needed to consummate the transactions, for example, customer and merchant information 46, 47 such as the name and address of the customer and merchant, a customer reference number, and the network address of the merchant, the amount to be paid 49, the date of payment 48, and the list of invoices 50 to be paid. As shown in FIG. 2B, the invoice includes sufficient information for the merchant to match to the accounts receivable system and to use in a dispute. Such invoice information may include an invoice number 51, a purchase order number 52, a due date 53, the amount of the invoice 54, the discount amount 55, and the net amount 56.

Tickets

Figure 3:
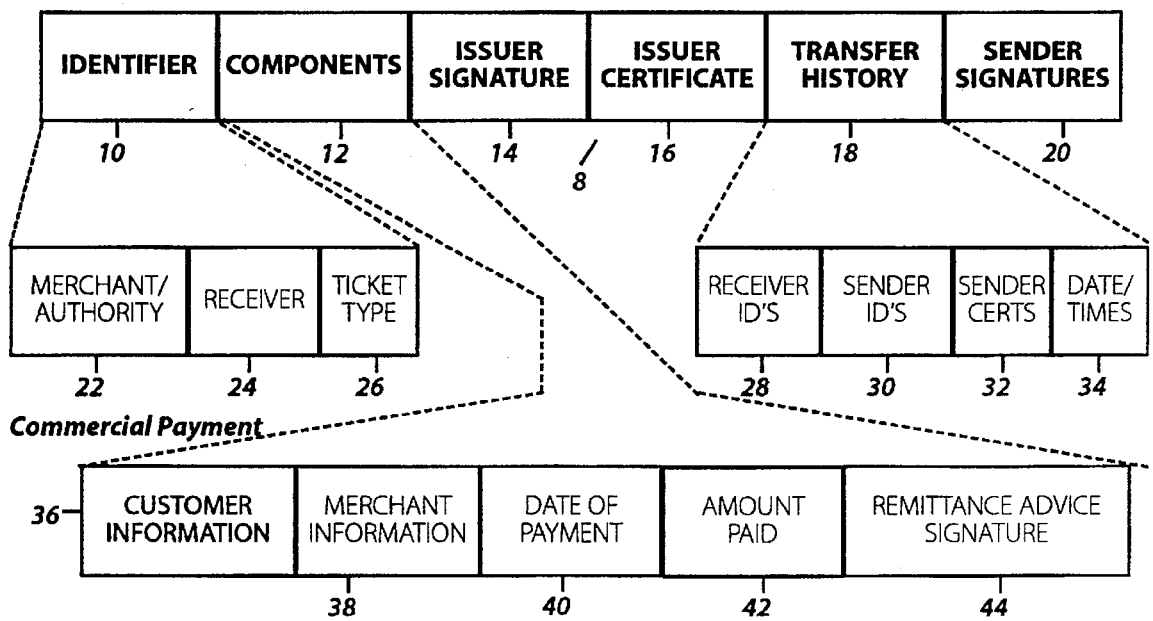
FIG. 3 illustrates the sections and fields of a Commercial Payment ticket.

Referring to FIGS. 1 and 3, a ticket 8 is an electronic item created by a MTA 4 and transferred to a CTA 2 during a transaction. Tickets may be thought of as the property of the trusted agents. A customer whose CTA 2 has just received a ticket may only use that ticket upon successful completion of the transaction.

As described in the 08/234,461 application, trusted agents support a variety of ticket types used for various purposes. However, of primary importance for the present invention are commercial payment tickets. A commercial payment ticket identifies the particulars of a commercial payment, has the payee's digital signature over the remittance advice, and be used by the customer in a dispute scenario.

FIG. 3 shows a preferred embodiment of a ticket 8 in which the ticket is comprised of six major sections: Identifier 10, Components 12, Issuer Signature 14, Issuer Certificate 16, Transfer History 18 and Sender Signatures 20. The sections, in turn, are comprised of various information containing fields.

The Identifier section 10 has a field 22 which holds information that identifies the merchant or authority creating the ticket. Such information, for example the merchant's authority's name, is copied from a merchant or authority credential held by the ticket issuer. The field 22 also contains the expiration date of the merchant or authority credential. A field 24 contains the receiving trusted agent's identification number. The field 24 also contains the expiration date of the ticket receiver's trusted agent credential. A field 26 designates the ticket type (e.g., credit or debit card ticket, commercial payment ticket, etc.).

The Components section 12 contains the basic ticket content which varies depending upon the ticket type and its specific purpose. FIG. 3 shows an example of components found in a commercial payment ticket.

A commercial payment ticket may have: a Customer Information field 36; a Merchant Information field 38; a Date of Payment field 40; an Amount Paid field 42; and a Remittance Advice Signature field 44 that is the MTA's digital signature over the remittance advice information.

The Issuer Signature section 14 of a ticket 8 holds a digital signature, formed by the ticket creator, over the Identifier and Components sections 10, 12. Such signature is made using a private key belonging to the issuer's trusted agent. The Issuer Certificate section 16 contains a certification by a trusted third party (hereinafter referred to as the "Trusted Agency") used in conjunction with the issuer signature to verify the authenticity of the issued ticket 8. Such certification is in the form of a certificate belonging to the issuer's trusted agent. The general use of certificates and digital signatures is known and described, for example, in D. W. Davies and W. L. Price, Security For Computer Networks (John Wiley & Sons, 1984).

The Transfer History section 18 contains information generated when tickets are transferred between trusted agents after the initial issuing of the ticket 8 by a merchant or authority. A Receiver ID's field 28 contains the receiving trusted agent's identification number. A Sender ID's field 30 contains the sending trusted agent's identification number. A Sender Certs field 32 contains the sending trusted agent's certificate. A Date/Times field 34 contains the date and time of transfer of the ticket 8. As subsequent transfers are made, additional receiver and sender ID's, sender certificates, and dates and times are appended to each field, thus creating a list of transfer history information. It may be noted that the trusted agent ID found in the Receiver field of the Identifier section, should be the same as the first ID in the Sender ID's field.

In addition, whenever a ticket 8 is transferred between trusted agents, the sender digitally signs the ticket over the five preceding ticket sections using a private key belonging to the sender's trusted agent. The Sender Signatures section 20 is then updated by appending the newly created digital signature, thus forming a list of sender signatures.

Transaction Devices

Figure 4:
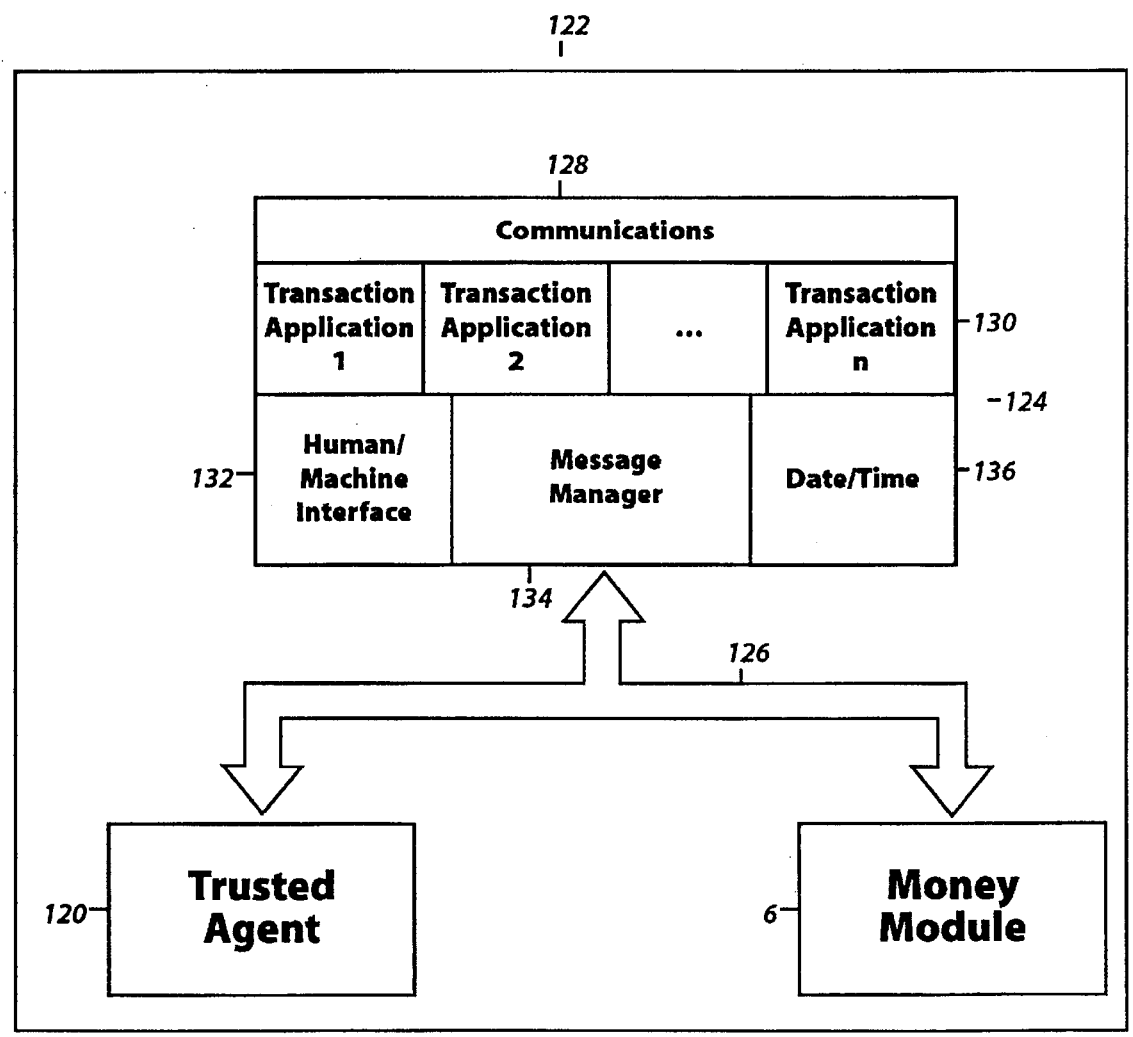
FIG. 4 illustrates the components of a transaction device.

Referring to FIG. 4, a trusted agent 120 is embedded in a transaction device 122. The transaction device 122 is composed of three major components for both the merchant and the customer. There is a host processor 124, a trusted agent 120, and a money module 6. These components are connected, for example, by a bus 126. When trusted agent 120 is a MTA 2, the device 122 is referred to as a merchant transaction device (MTD). When trusted agent 120 is a CTA 4, the device 122 is referred to as a customer transaction device (CTD).

FIG. 4 shows the functional components of the host processor 124. The host processor provides the following functions: Communications 128, Transaction Applications 130, Human/Machine Interface 132, Date/Time 136, and a Message Manager 134.

The Communications function 128 supports communications between the transaction device 122 and the outside world. Such communications may be wired or wireless, broad or narrow band, so long as communications are compatible between the devices. The Communications function 128 sets up the connection between two transaction devices 122, or connects a transaction device to a network for indirect connection to another transaction device or a trusted server.

Transaction Applications 130 may perform a variety of tasks. For example, a transaction application may pay invoices received from prior transactions. In general, a transaction device 122 contains all the processes to choose, buy and possibly use electronic objects, electronic money, credentials, and other tickets 8, or the processes to sell the same.

The Human/Machine Interface function 132 provides the look and feel of the transaction device 122. It could include a keyboard, mouse, pen, voice, touch screen, icons, menus, etc. The Human/Machine Interface 132 communicates with other functions in the trusted agent 120 and the money module 6 through the message manager 134. In some applications a Human/Machine Interface 132 may not be necessary, for example, in a fully automated merchant or customer transaction device.

The Date/Time function 136 is set by the owner of the transaction device 122 and includes date, time and time zone. The Date/Time information is fed to the embedded trusted agent 120 whenever the trusted agent is opened for use.

The Message Manager 134 routes inter-host messages (i.e., messages between transaction devices) and messages among the host processor 124, the trusted agent 120 and the money module 6.

Trusted Agents

Figure 5A:
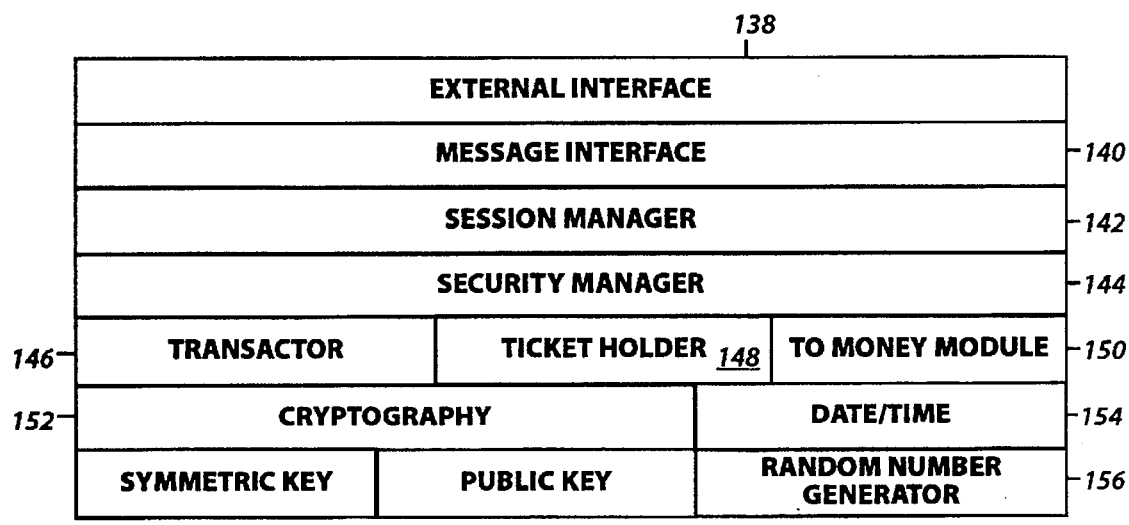
FIGS. 5A–5D illustrate the functional components of trusted agents.
Figure 5B:
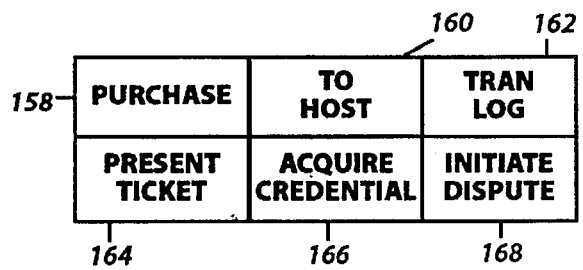
Figure 5C:
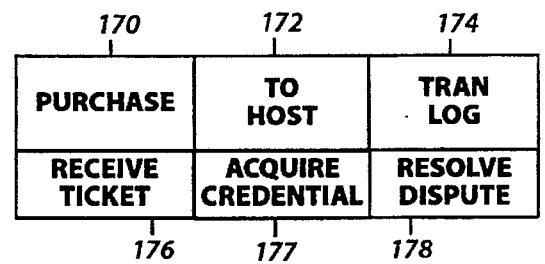
Figure 5D:
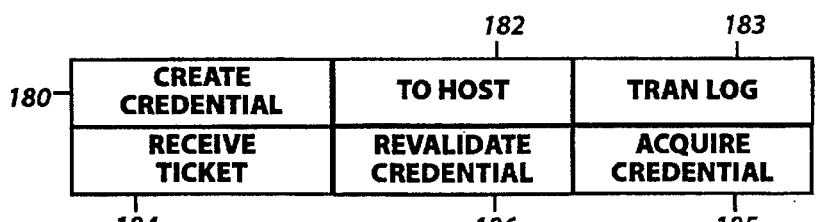

FIG. 5A shows the functional components of a trusted agent 120. The contemplated system for open electronic commerce uses three types of trusted agent 120 which differ in certain unique Transactor functions 146 that they provide. FIG. 5B shows the transactor functions found in a CTA 2. FIG. 5C shows the transactor functions found in a MTA 4. FIG. 5D shows the transactor functions found in an Authority Trusted Agent (ATA) which, in turn, is embedded in an Authority Transaction Device (ATD). ATDs are associated with credential issuing authorities such as a bank.

An External Interface function 138 provides physical communication with the host processor 124 and the money module 6 of the transaction device 122 in which the trusted agent 120 is embedded. A Message Interface function 140 processes and routes inter-agent and intra-agent messages. A Session Manager function 142 sets up and breaks down inter-agent sessions and agent to trusted server sessions. A Security Manager function. 144 maintains security information (e.g., a trusted agent certificate and an untrusted agent list) and establishes secure communication with a counterparty trusted agent (via the host processor 124) and with the local money module 6 within the same transaction device 122. The Transactor function 146 provides the protocols to perform a transaction. Customer, merchant and authority transactors are used for CTAs, MTAs and ATAs, respectively.

FIG. 5B shows the customer transactor functions. A Purchase function 158 exchanges payment for tickets 8 and electronic objects. A To Host function 160 provides an interface to the transaction device's host processor 124. A Present Ticket function 164 presents tickets 8 to obtain information or services. An Acquire Credential function 166 interacts to receive a credential ticket. A Tran Log function 162 maintains a log of trusted agent transactions. Both CTAs 2 and MTAs 4 maintain a transaction log which stores the following information: transaction type (e.g., ticket type); a pre-transaction ticket image; a post-transaction ticket image; dispute information including the date of dispute (as maintained by each trusted agent in the dispute dialog), status, and merchant resolution (e.g., replace, refund, denied); and recertifying information (e.g., date of recertification). An Initiate Dispute function 168 presents electronic merchandise if a customer is dissatisfied.

FIG. 5C shows the merchant transactor functions. A Purchase function 170 exchanges tickets 8 and electronic objects for payment. A To Host function 172 provides an interface to the transaction device's host processor 124. A Receive Ticket function 176 processes a received ticket 8 to provide service or information. An Acquire Credential function 177 obtains a merchant credential. A Tran Log function 174 maintains a log of trusted agent transactions. A Resolve Dispute function 178 receives tickets 8 and electronic objects to resolve a customer complaint.

FIG. 5D shows the authority transactor functions. A Create Credential function 180 constructs and delivers credential tickets to a requestor. A To Host function 182 provides an interface to the transaction device's host processor 124. A Receive Ticket function 184 processes a received ticket 8 to provide service or information. A Revalidate Credential function 186 accepts a current credential and reissues the credential with a new expiration date. A Tran Log function 183 maintains a log of transactions. An Acquire Credential function 185 obtains an authority credential.

Referring again to FIG. 5A, a To Money Module function 150 communicates with the money module 6 in the same transaction device 122 to provide payment. A Cryptography function 152 provides public key and symmetric key cryptographic functions. Any well known public and symmetric key cryptography techniques may be used, for example, RSA and DES. A Ticket Holder function 148 creates tickets 8 in a MTA 4 or stores and retrieves tickets 8 in a CTA 2. A Random Number Generator function 156 generates random numbers to produce cryptographic keys. A Date/Time function 154 manages the date and time delivered from the host processor 124 to date tickets 8 and validate certificates and presented tickets. Current clock information is fed to the trusted agent 120 every time the trusted agent is opened (i.e., signed on for use) and maintained until the trusted agent is closed.

The trusted agent/money module hardware may consist of the following: a microcontroller (e.g., Intel 196 family) for executing the transaction protocols; a high-speed volatile memory (e.g., SRAM) for storing the operating system, parts of the applications, cryptography, etc. during execution; a non-volatile memory (e.g., flash memory) for storing the operating system, applications, tickets, electronic money, logs, etc.; an integrated circuit clock for providing a time reference; a battery for the clock; and a noisy diode or other random source for a random number generator.

System Overview

Figure 6:
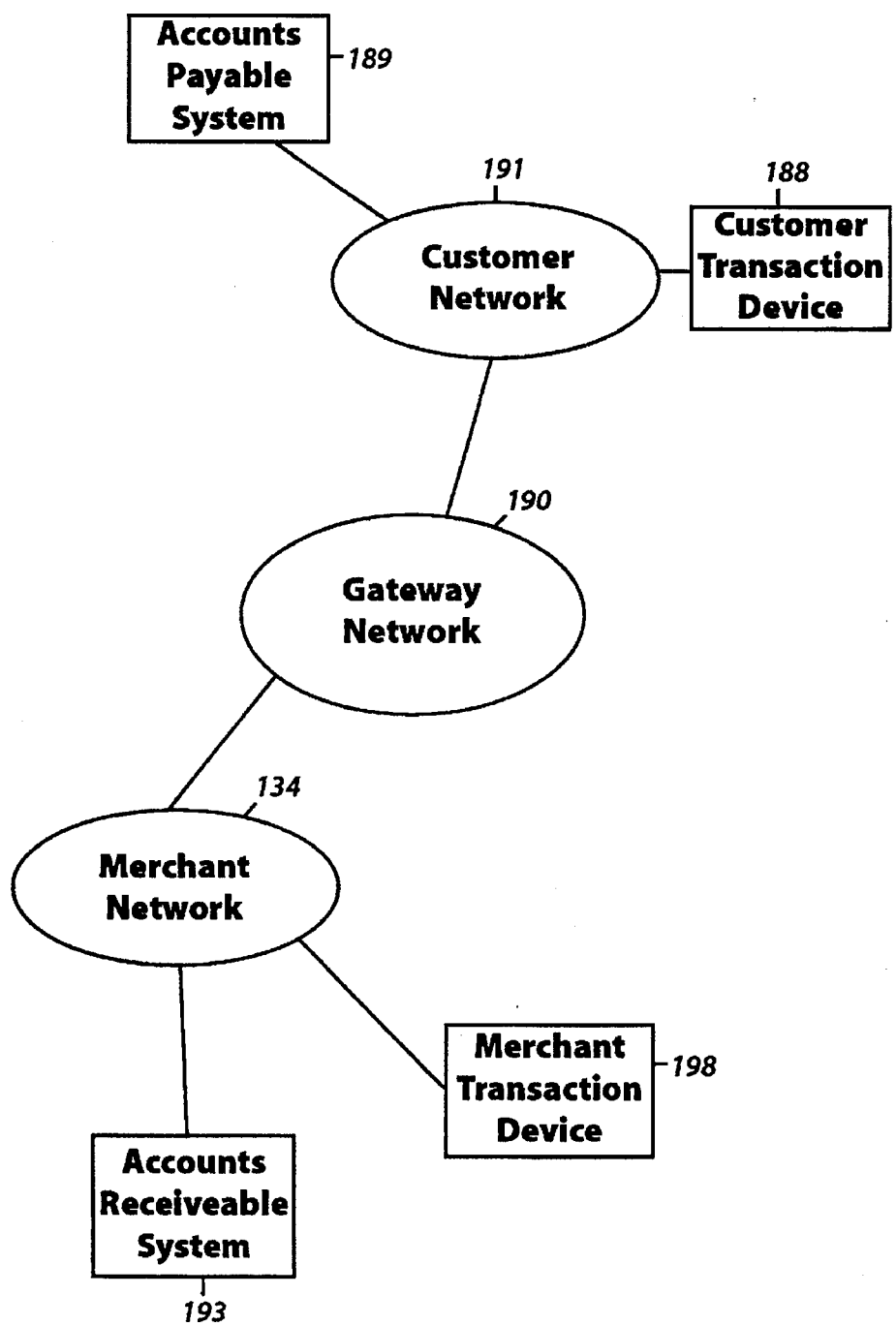
FIG. 6 is a diagram showing the network structure for commercial money module payment.

FIG. 6 shows the general network architecture of the contemplated system for commercial payments. Customer transaction device 188 can communicate with the customer's accounts payable system 189 via the customer network 191. The customer's accounts payable system creates the remittance advice having a list of invoices to be paid and sends this information to CTD 188.

Once the CTD 188 has the remittance information, it ensures that its money module 6 has sufficient funds for payment or obtains electronic money from another transaction device or from the customer's bank account as described in my co-pending U.S. patent applications Ser. Nos. 07/794,112, and 08/234,461 and 08/427,287. If paying with credit, the CTD 188 must either have the credit on-hand or go to the bank to get it.

When the CTD 188 has both the remittance advice and the electronic money, it can connect with a merchant network 134 over some gateway network 190. The merchant network provides communications for MTD 198 and the merchant's accounts receivable system 193. The accounts receivable system 193 is used to match outstanding invoices to received remittance information. The commercial payment system of the present invention then allows the customer to make a secure money module payment to a merchant, and in return receive a commercial payment ticket having the MTD's signature over the remittance information.

Flow Charts

The flow charts shown in the following figures use the designations "A" and "B" to indicate two interacting trusted agents 120. The same designations A and B, may also be applied to the host processor 124 or money module 6 associated with a particular trusted agent 120 (i.e., within the same transaction device 122). The flow charts indicate the functional component primarily responsible for carrying out a given task. For example, SECURITY MANAGER A means that the recited task is carried out by the Security Manager function 144 (see FIG. 5A) in trusted agent A.

The flow charts also call subroutines some of which use parameter designations X and Y. For example, ESTABLISH SESSION A→B is a call to the subroutine Establish Session. The Establish Session flow chart should then be followed with the understanding that X=A and Y=B throughout the flow.

Abort And Commit

In transaction processing of the type contemplated it is desirable to pass electronic items such as tickets 8 and electronic notes between two parties, while maintaining a zero-sum game. In other words, it is undesirable to duplicate electronic items so that at the completion of an electronic transaction there are twice as many items as before the transaction. Similarly, it is undesirable to lose electronic items so that there are fewer items after the transaction than before. For example, if at the start of a transaction A has an electronic ticket 8 and wishes to pass it to B, then it is desirable to ensure that at the end of the transaction, B has the electronic ticket 8 and A does not have the electronic ticket. In the real world, however, it is possible to have two other outcomes, namely, both A and B have the same electronic ticket 8 (duplication) or neither A nor B have the electronic ticket 8 (loss).

In order to render the likelihood of duplication or loss negligible, the transaction protocol must take into account the possibility that natural or intentional events may interrupt a typical transaction flow. A natural interruption is exemplified by a breakdown of the communications link between A and B during the transaction. To minimize the possibility of duplication or loss from such a random event the window of opportunity for creating a duplication or loss must be minimized. In order to minimize intentional interruptions (i.e., overt attacks), it is desirable to eliminate the economic incentive for such an attack. For example, if an attacker could only lose the tickets and or the money by trying to interrupt a transaction, the attacker would have no incentive to initiate the attack in the first place.

These concepts are embodied in the efficient transaction protocols of the described system. In particular, it is desirable to ensure consistent abort and commit states between the two transacting trusted agents 120 (or money modules 6). For example, if A commits to a transaction, then B should also commit to the transaction; or, if A aborts the transaction, then B should also abort the transaction. To achieve consistency and minimize the possibility of duplication or loss (in the event there is an inconsistency) the transaction protocols take into account the order and timing of A's and B's committing to a given transaction.

FIG. 7 shows two subroutines, Abort and Commit. The abort subroutine is internally executed within a given trusted agent 120 when the transaction it is involved in fails. The abort subroutine rolls back or returns the trusted agent 120 to the exact state it was in prior to being involved with the failed transaction. In addition, if the merchant trusted agent aborts after an authorization, then the authorization will be reversed. Conversely, the commit transaction is internally executed within a given trusted agent 120 when the transaction it is involved in has been successfully completed. The trusted agent 120 therefore records the completed transaction in its transaction log and is now ready for a new transaction. For example, during a ticket transfer transaction an electronic ticket 8 is passed from trusted agent A to trusted agent B. Since at this point in time neither A nor B have committed or aborted the transaction, A provisionally retains the ticket 8 while B provisionally also has the ticket 8. If both A and B commit then A will delete its ticket 8, and B's retention of the ticket 8 will no longer be provisional. If, however, both A and B abort then A will retain its ticket 8 and the ticket 8 that B was retaining provisionally will be deleted by rolling back the transaction. Note that the deletion operation may be implemented in various ways well known in the art. As mentioned before, it is desirable to minimize the possibility of one trusted agent 120 committing while another trusted agent 120 aborts because this may in some limited circumstances result in duplicating or losing electronic items.

A similar situation exists with respect to money modules 6 exchanging electronic notes. During a purchase transaction, electronic notes are passed from money module A to money module B, so that A provisionally decrements its electronic notes (by the amounts transferred) while B provisionally has electronic notes (in the transferred amount). If both A and B commit then A will retain the notes in the decremented amounts and B's retention of the electronic notes will no longer be provisional.

Figure 7A:
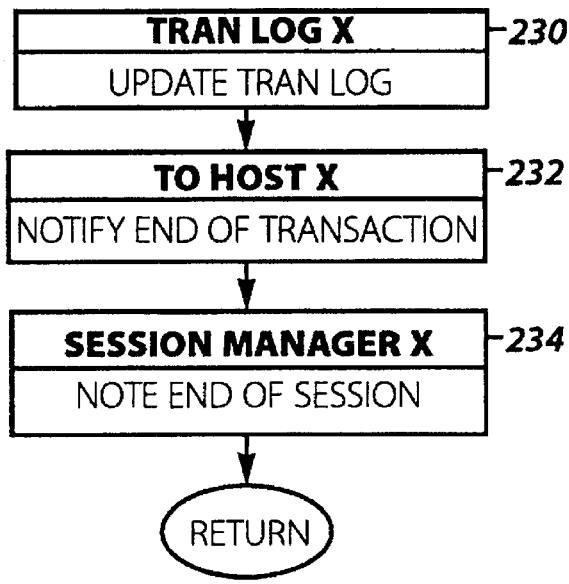
FIG. 7A illustrates a Commit protocol.

FIG. 7A shows the commit subroutine. Tran Log X updates the transaction log. To Host X notifies the host that the transaction is complete. Session Manager X notes the end of the session. (Steps 230–234).

Figure 7B:
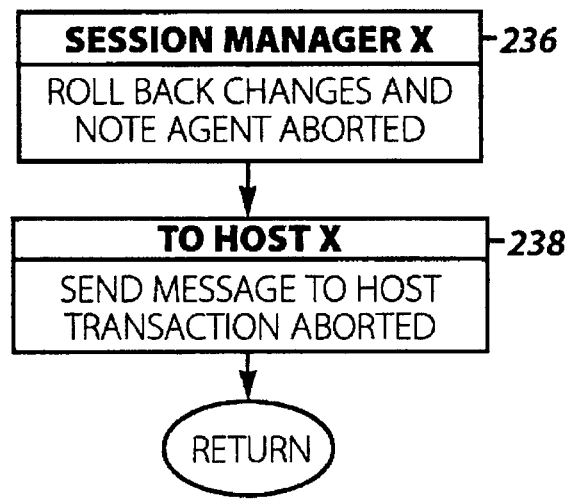
FIG. 7B illustrates an Abort protocol.
Figure 8A:
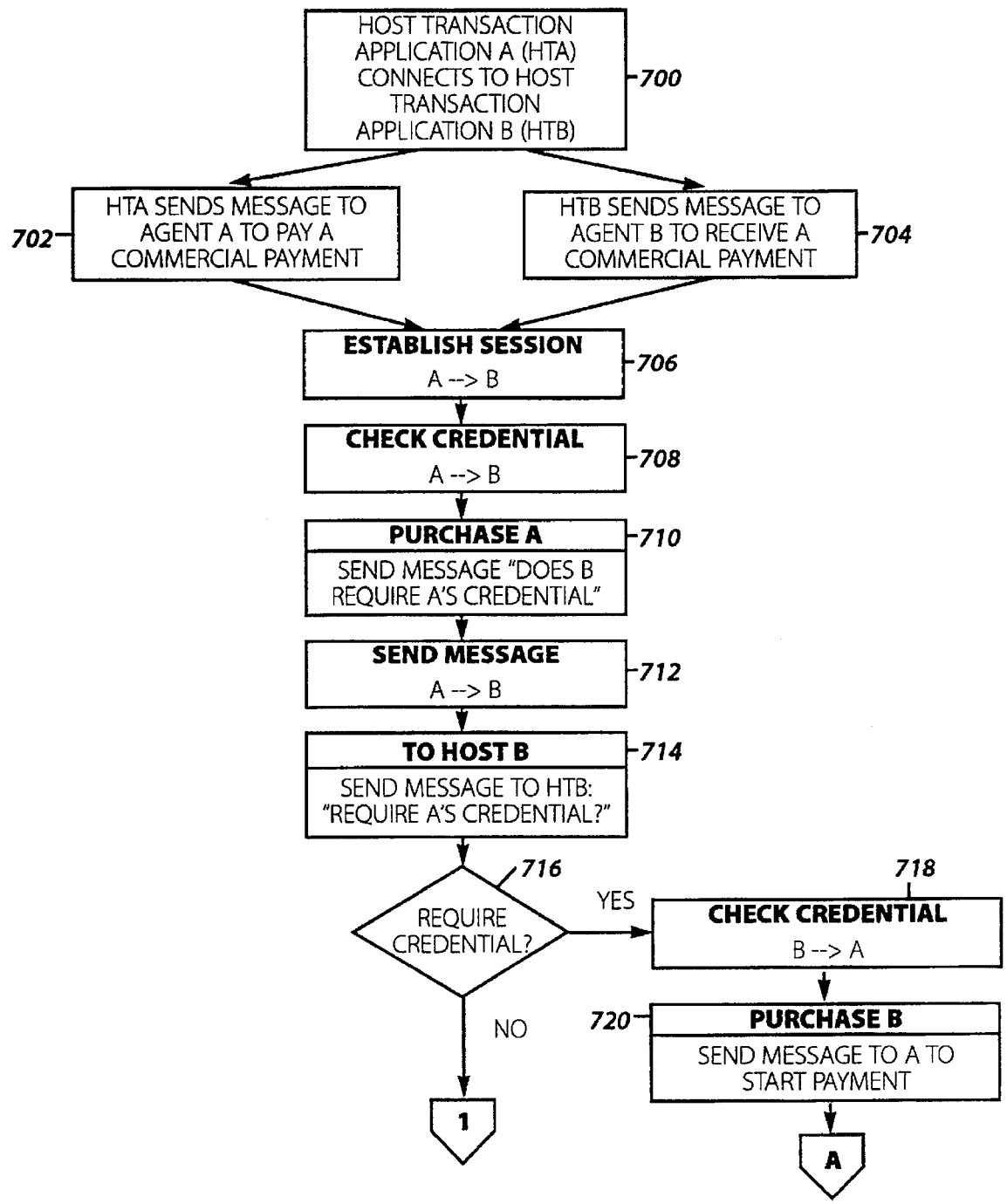
FIGS. 8A–8D illustrate a Commercial Money Module Payment.
Figure 8B:
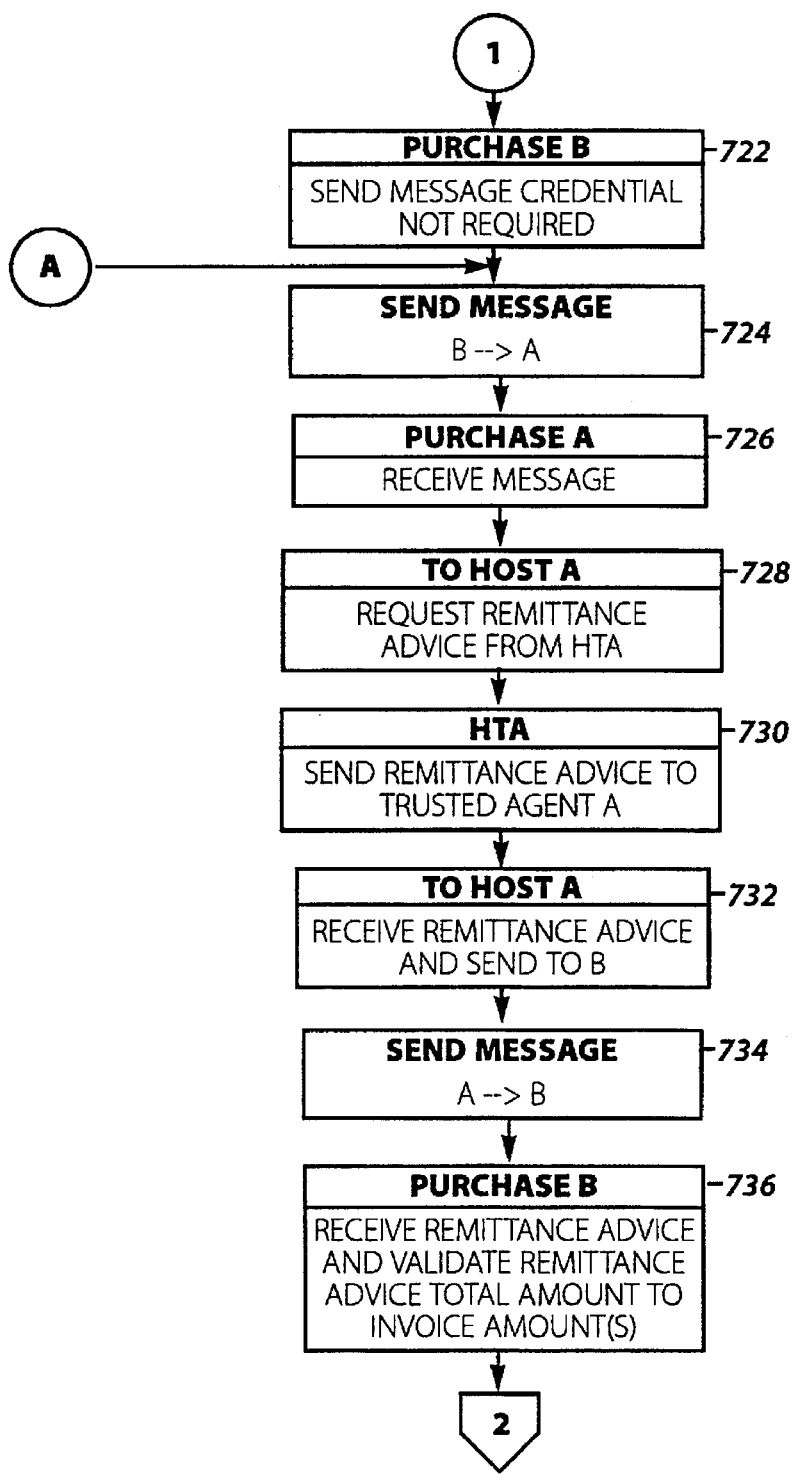
Figure 8C:
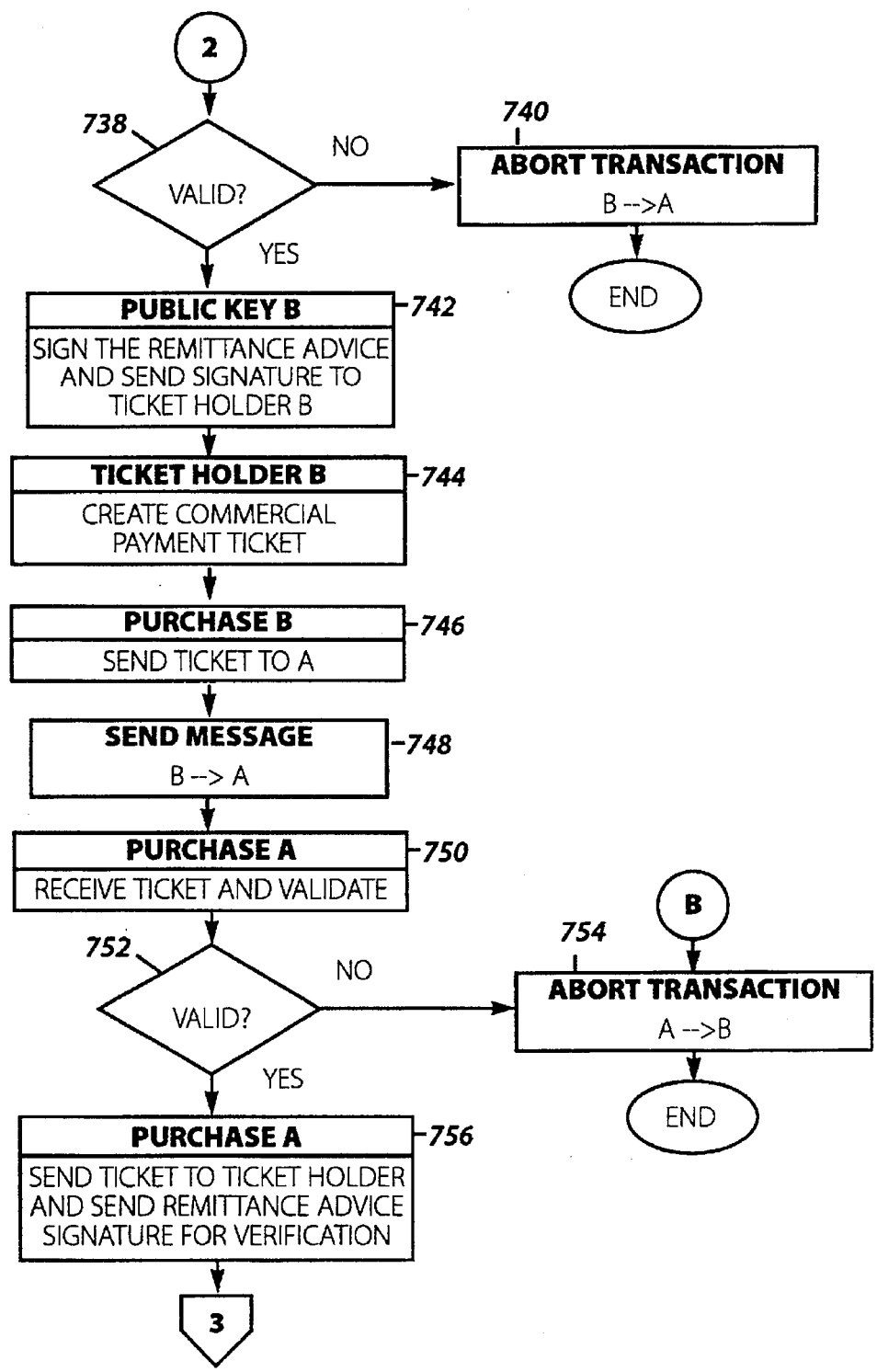
Figure 8D:
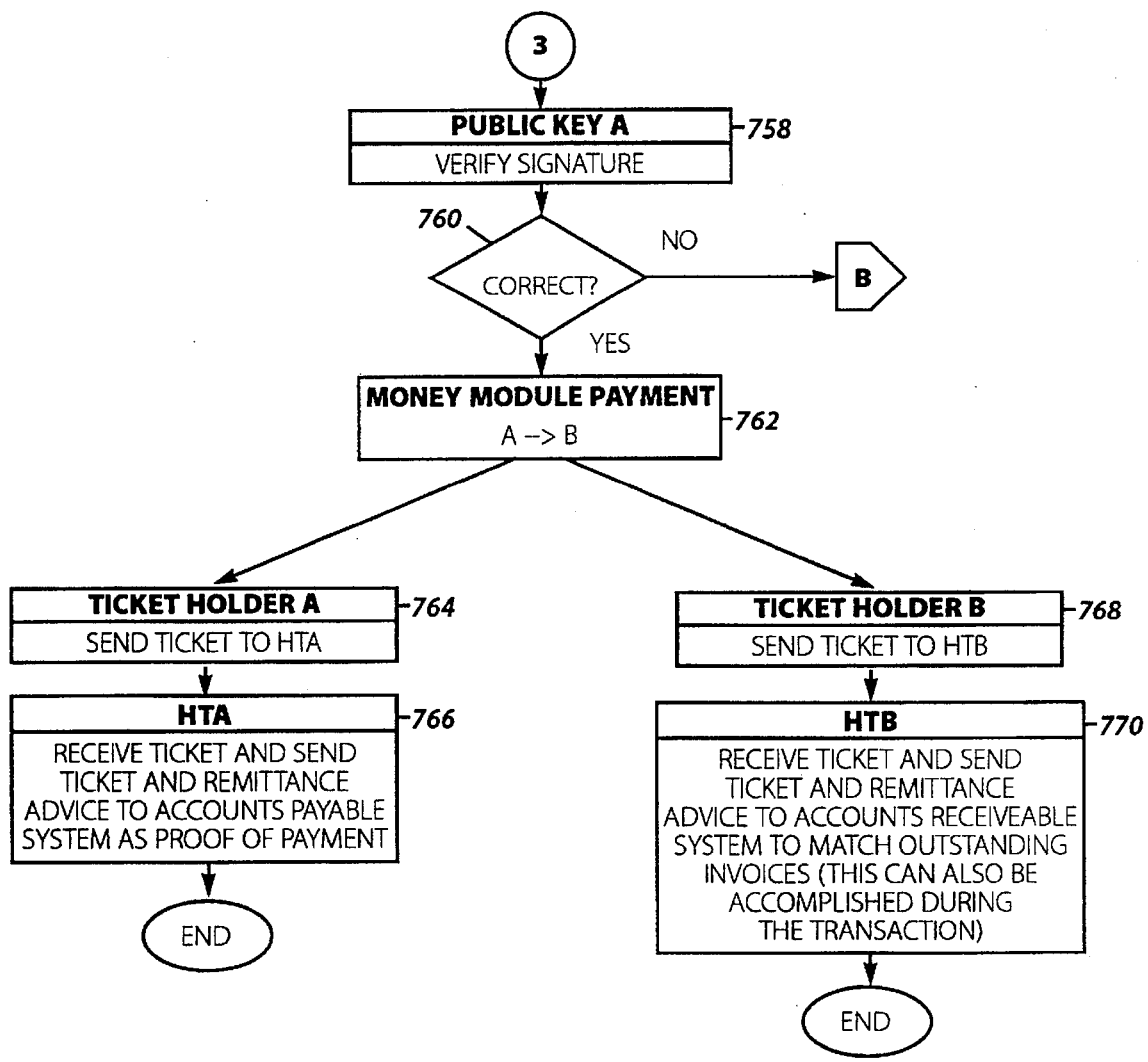
Figure 9A:
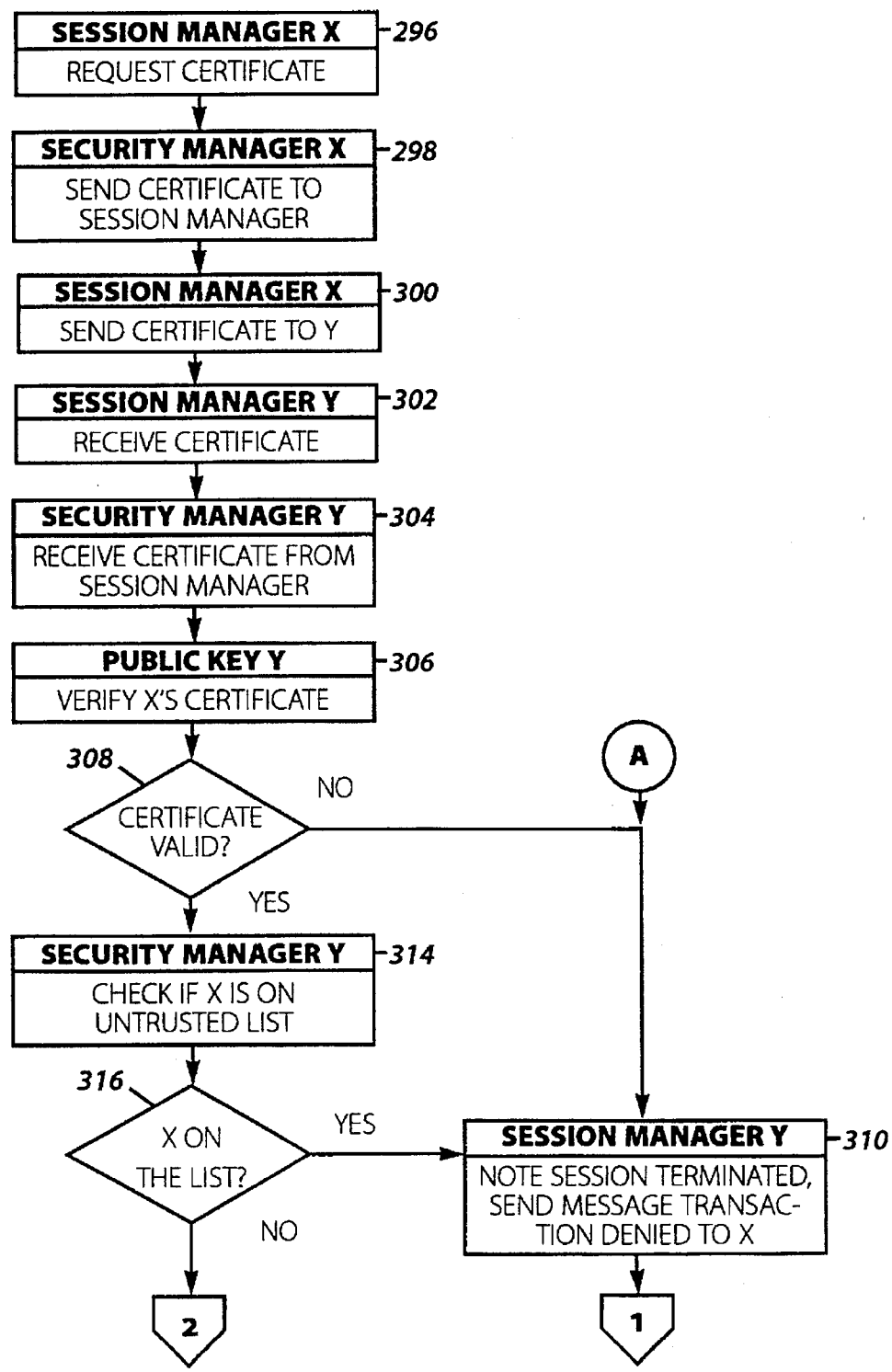
FIGS. 9A–9E illustrate an Establish Session protocol.
Figure 9B:
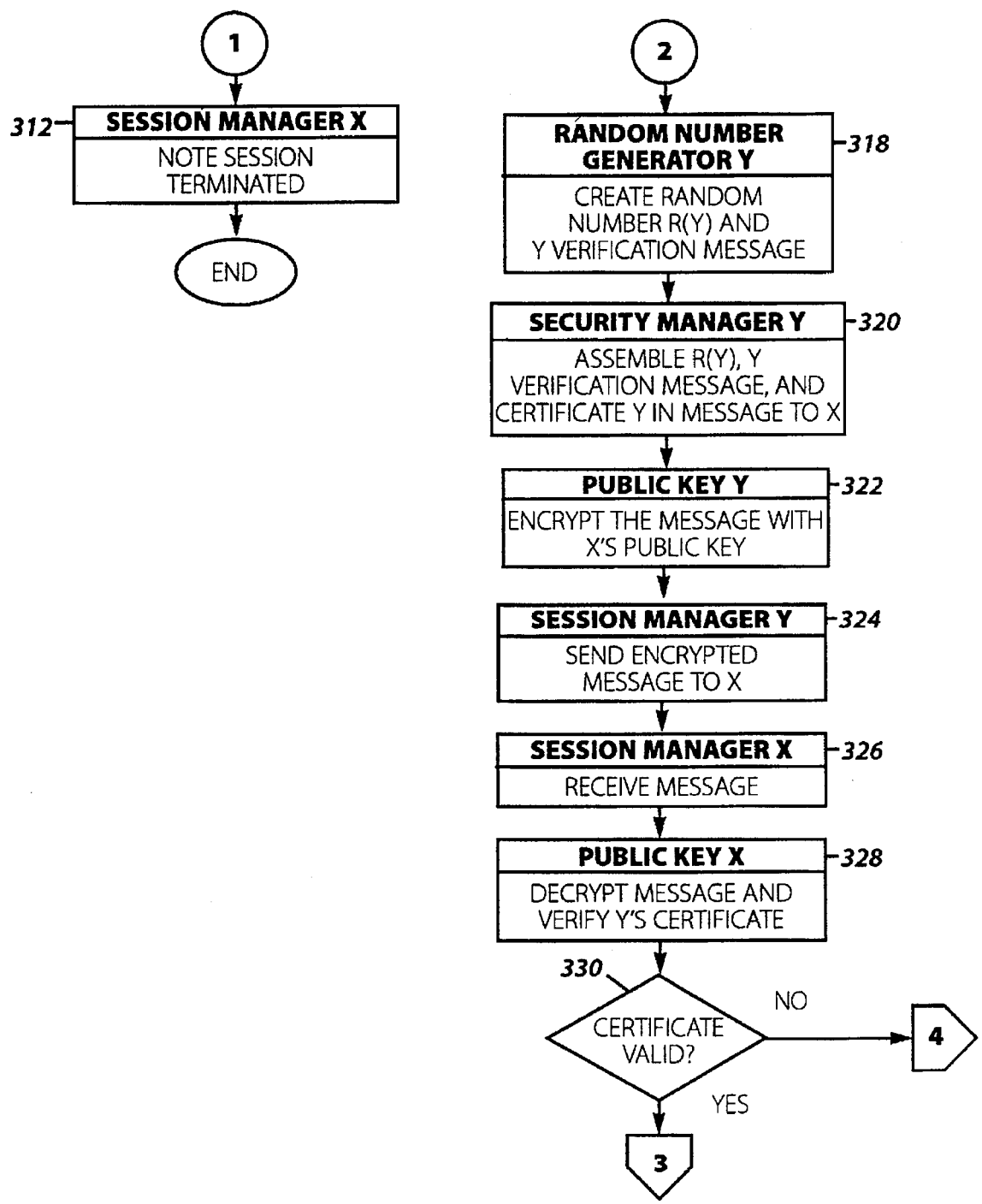
Figure 9C:
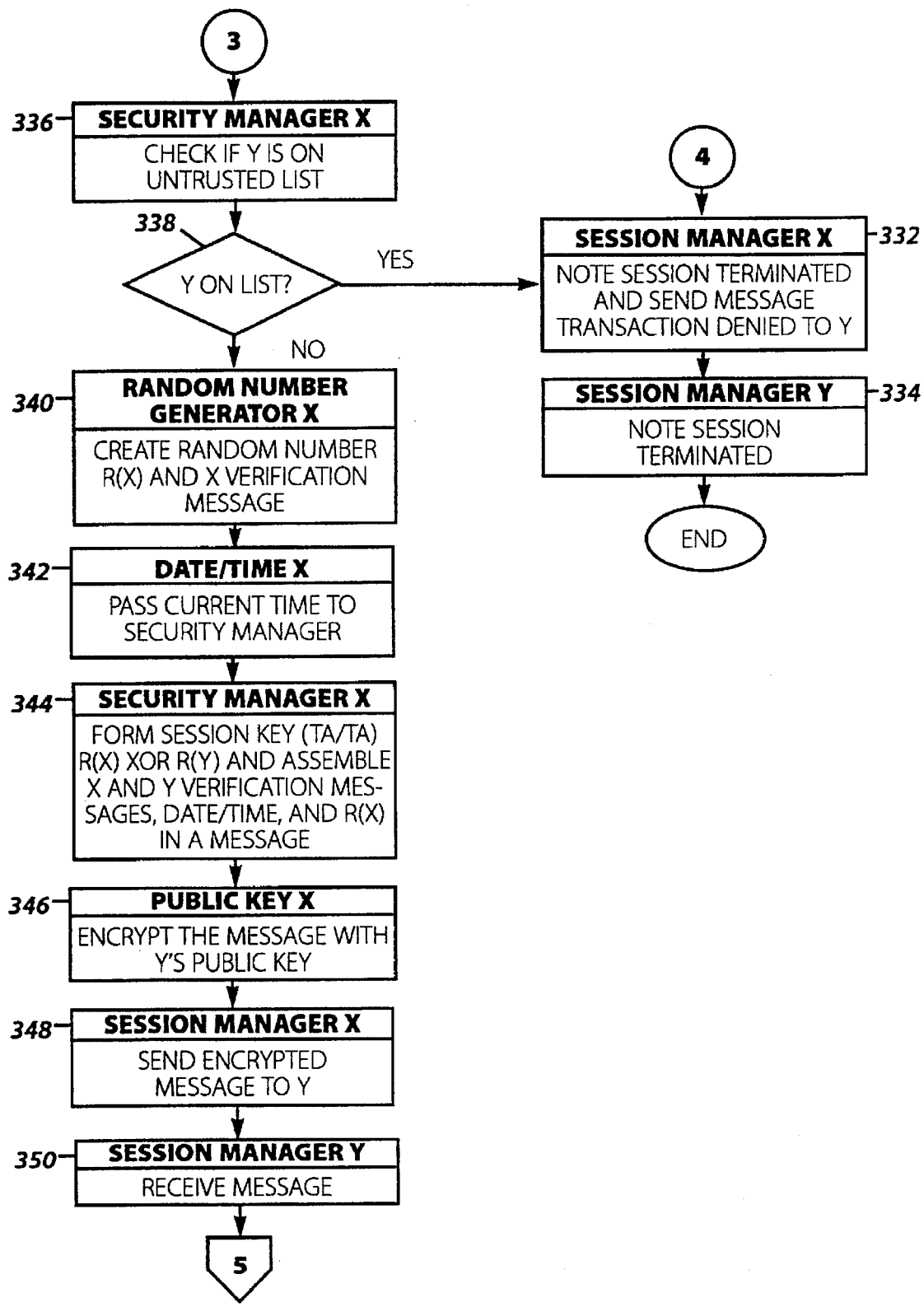
Figure 9D:
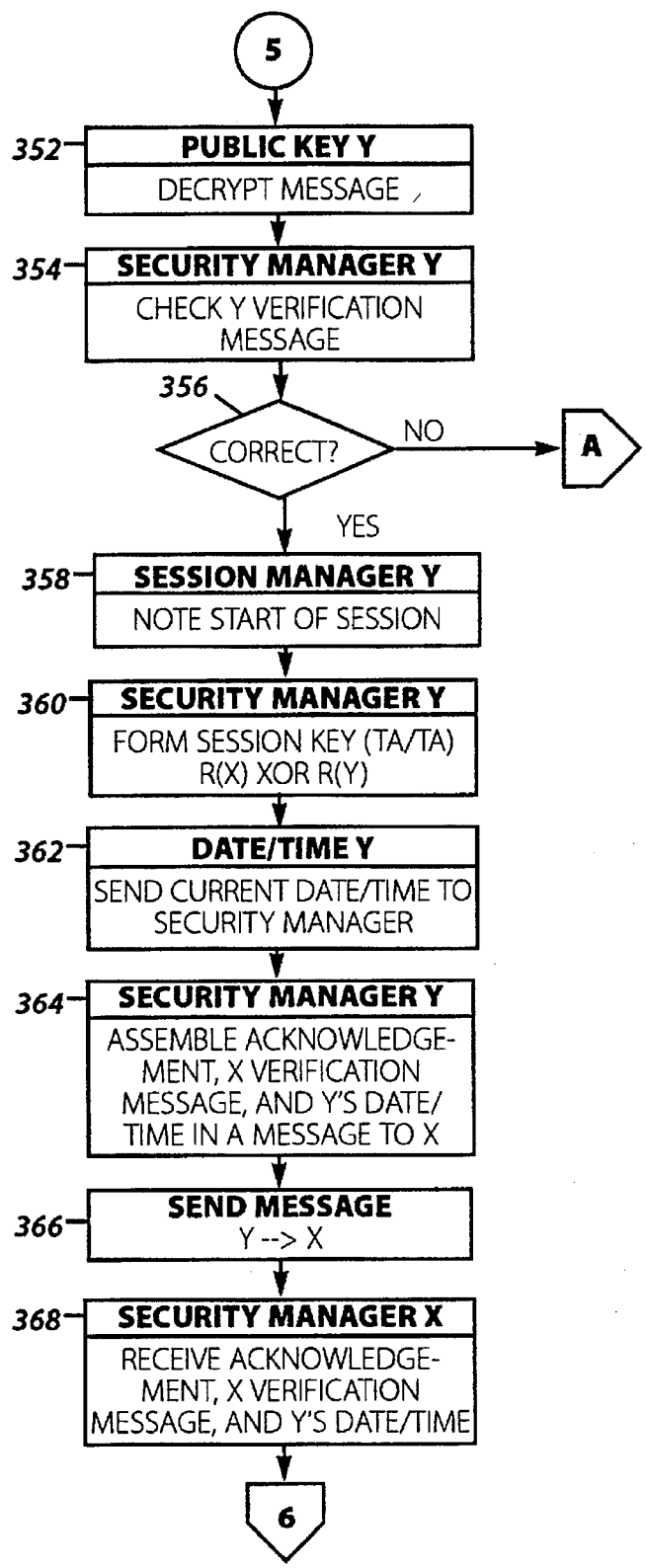
Figure 9E:
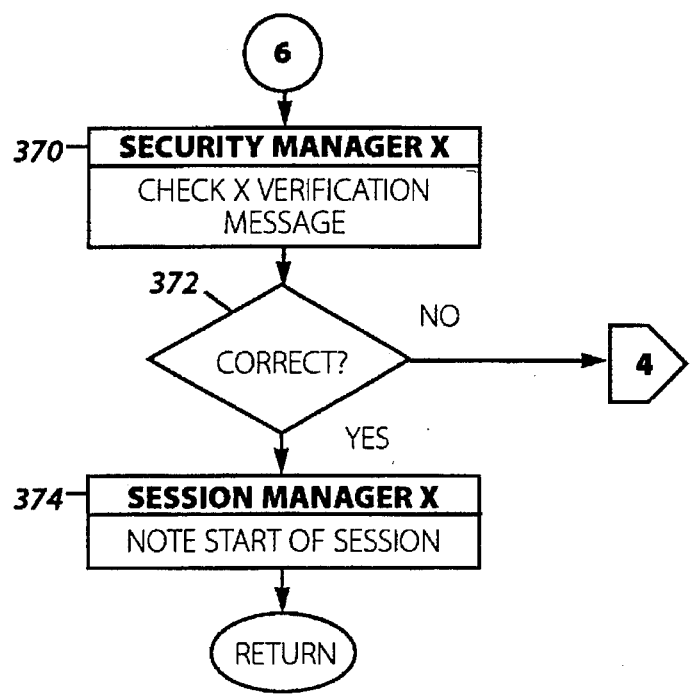

FIG. 7B shows the abort subroutine. Session Manager X rolls back changes and notes agent aborted. The Session. Manager keeps track of what has been done since the start of a session and when rolling back undoes these steps. To Host X sends a message to the host that the transaction is aborted. (Steps 236–238).

The abort subroutine may be called directly from a flow diagram, for example, when a trusted agent 120 determines that a certificate is not valid. The abort subroutine may also be called when an expected action does not occur. In particular, when two trusted agents 120 are communicating, they will be monitoring a time-out protocol. For example, after a first trusted agent 120 has sent a message to a second trusted agent 120, the Session Manager of the first trusted agent (A) will set a timer for a reply if a reply is required. The Session Manager may also number the message sent. This number would appear in the reply message from the Session Manager of the second trusted agent (B).

If the timer expires before the message has been received, then Session Manager A will query Session Manager B to determine if the transaction is still running in B. If B does not reply then Session Manager A will abort the transaction. If a reply is received that the transaction is proceeding, then the timer will be reset to a new time. If A queries B a predetermined number of times without receiving a reply to the original message, then A will abort the transaction. A similar time-out function exists in the money modules 6.

Commercial Money Module Payment

FIG. 8 shows the flow chart for a commercial money module payment. Initially, remittance information from an accounts payable system 189 is sent to the host transaction application A (HTA). Though accounts payable system 189 is preferably an automated system, the teachings of the present invention still apply to a manual system (e.g., where remittance data is keyed into the HTA). HTA then connects to host transaction application B (HTB) preferably via a customer network 191, gateway network 190 and merchant network 134 (step 700), and the customer chooses to make a commercial payment. HTA sends a message to its trusted agent A to pay a commercial payment, and HTB sends a message to its trusted agent B to receive a commercial payment (steps 702–704).

The customer's and merchant's trusted agents (A and B) then establish a session as described in co-pending U.S. application Ser. No. 08/234,461. In particular, an Establish Session subroutine is called (step 706) for setting up a cryptographically secure communication channel between trusted agent A and trusted agent B. Referring to FIG. 9, the Session Manager of trusted agent A requests and then receives A's certificate (i.e., cert(TA)) from the Security Manager (steps 296–298). Session Manager A then sends cert(TA) to trusted agent B's Session Manager which, in turn, passes it along to its Security Manager (steps 300–304).

Trusted agent B's Public Key function verifies the cert (TA) by using the validation protocols such as those discussed in co-pending U.S. applications Ser. Nos. 08/234,461 and 08/427,287 (steps 306–308).

If cert(TA) is not valid, then Session Manager B notes that the session is terminated and informs Session Manager A that the transaction is denied. Session Manager A also notes that the session is terminated. (Steps 310–312). If cert(TA) is valid, then Security Manager B checks if trusted agent A is on the untrusted list (steps 314–316). If trusted agent A is untrusted, then the session is terminated (steps 310–312).

If A is not on the untrusted list, then Random Number Generator B creates a random number R(B) and also a B verification message (step 318). The random number R(B) will eventually be used to form a session key. The B verification message is a random number used by B to protect against message replay. Next, Security Manager B assembles R(B), the B verification message, and cert(TA) into a message for trusted agent A (step 320). Public Key B encrypts the message using trusted agent A's public key (TA(PK)) which trusted agent B received with A's cert(TA) (step 322). Session Manager B sends the encrypted message to A's Session Manager (steps 324–326).

Public Key A decrypts the message using its private key (corresponding to its public key) and verifies the validity of cert(TA) (steps 328–330). If cert(TA) is invalid, then Session Manager A notes the session as terminated and sends a transaction denial message to B whose Session Manager also notes the session as terminated (steps 332–334). If cert(TA) is valid, then Security Manager A checks if trusted agent B is on the untrusted list (steps 336–338). If trusted agent B is on the list, the session is terminated (steps 332–334).

If B is not on the untrusted list, then Random Number Generator A creates a random number R(A) and an A verification message (e.g., another random number) (step 340). The Date/Time function passes the current date and time to the Security Manager (step 342). Dates and times are exchanged by A and B for eventual recording in their trans logs during commits. Security Manager A then forms and stores session key (TA/TA) by exclusive ORing random numbers R(A) and R(B) (step 344). Session key (TA/TA) is used to encrypt communications between two trusted agents 120. Session Manager A assembles a message containing the A and B verification messages, the date/time information, and R(A) (step 344). Public Key A encrypts the message with trusted server B's public key (received by A in cert (TA)) and sends the encrypted message to trusted server B's Session Manager (steps 346–350).

Public Key B decrypts the received message using its secret key (corresponding to its public key) (step 352). Security Manager B checks if the B verification message received from A is the same B verification message it previously sent to A (steps 354–356). If it is not the same, then the session is terminated (steps 310–312). If it is the same, then Session Manager B notes the start of the session (step 358).

Security Manager B forms session key (TA/TA) by R(A) XOR R(B) and then stores the session key (step 360). At this point, both A and B have created and stored the same session key (i.e., session key (TA/TA)) to be used for their current interaction. Next, Date/Time B sends its current date and time information to Security Manager B (step 362). Security Manager B assembles a message having an acknowledgement to A, the A verification message, and B's date/time information (step 364). The Send Message subroutine is then called (step 366) for sending the message from B to A.

Figure 10:
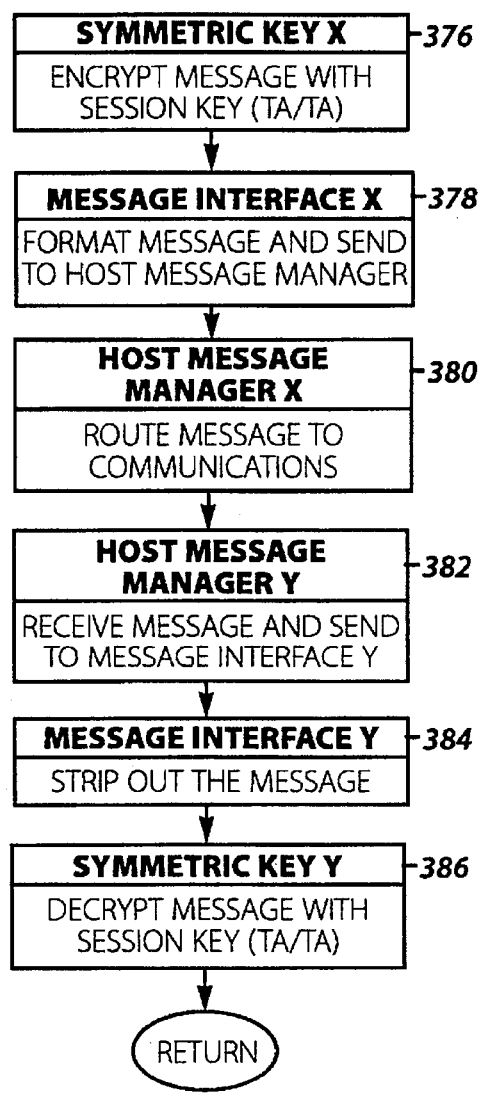
FIG. 10 illustrates a Send Message protocol.

Referring to FIG. 10, trusted agent B's Symmetric Key function encrypts the message using session key (TA/TA) (step 376). Message Interface B then formats the message and sends it to the host processor's Message Manager (step 378). Host Message Manager B then routes the message via Communications to Host Message Manager A in trusted agent A's host processor (step 380). Host Message Manager A then sends the message to trusted agent A's Message Interface which strips out the message (steps 382–384). Symmetric Key A decrypts the message with session key (TA/TA) thus completing the secure communication of a message between trusted agent and trusted agent using session key (TA/TA) (step 386).

Referring again to FIG. 9, Security Manager A receives the acknowledgement, A verification message and B's date/time information (step 368). Security Manager A checks if the A verification message is the same A verification message which A previously sent to B (steps 370–372). If it is not the same, then Session Manager A terminates the session (steps 332 334). If it is the same, then Session Manager A notes the start of the session (step 374).

Figure 11:
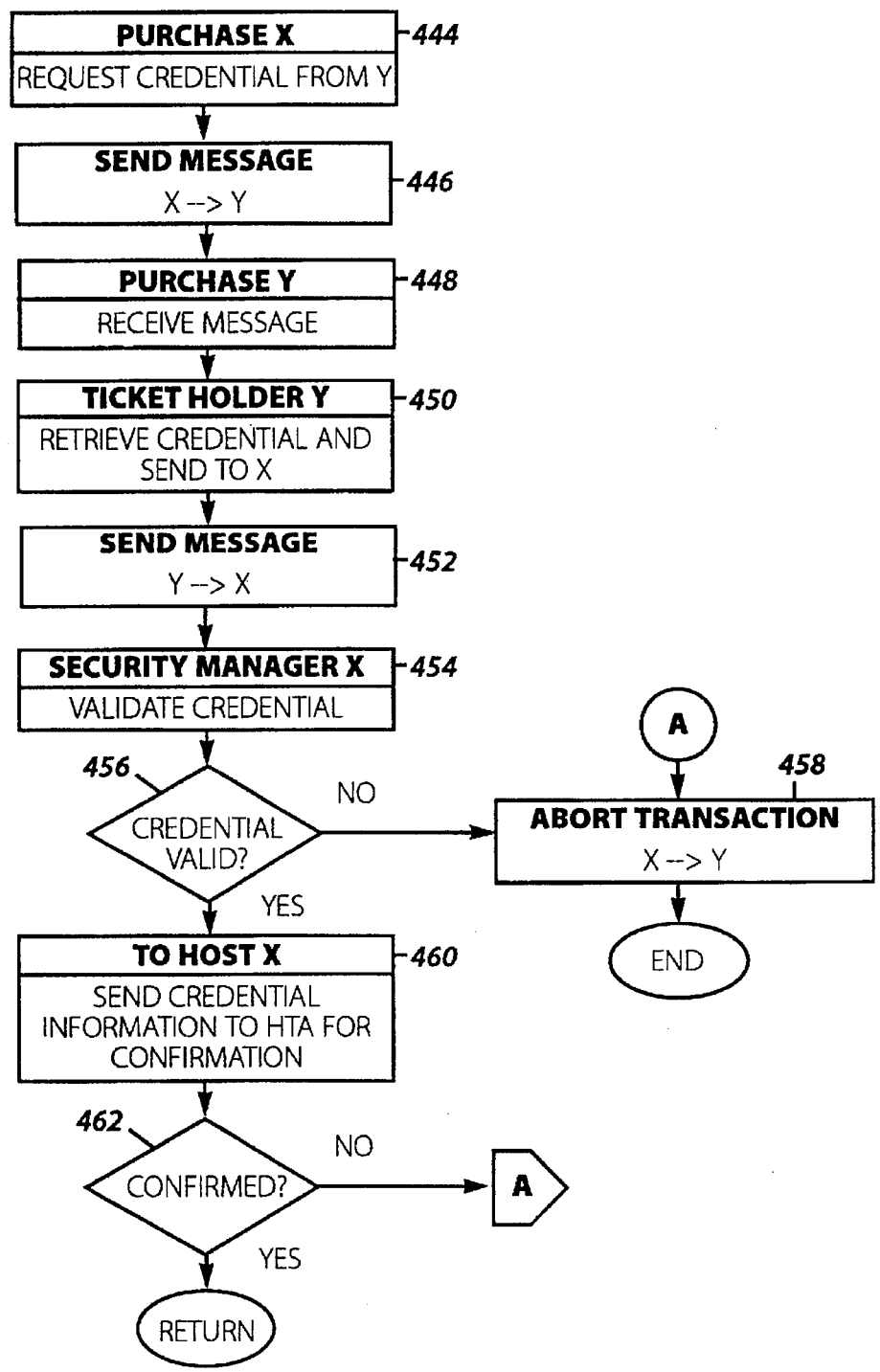
FIG. 11 illustrates a Check Credential protocol.

Referring again to FIG. 8, after establishing a session, trusted agent A requests and checks the merchant credential of trusted agent B, also as described in U.S. application Ser. No. 08/234,461. In particular, referring to FIG. 11, the Check Credential subroutine is called (step 708). All MTDs 198 contain a credential identifying the owner/merchant (e.g., NYNEX, Ticketron, etc.). Such merchant credentials may, for example, be issued by a merchant identification authority controlled by the Trusted Agency. On the other hand, customer credentials held by CTDs 188 may include driver's licenses or credit cards for individuals or the customer credentials may be commercial credentials such as those held within a MTD 198, and issued by various identification authorities. Referring to FIG. 11, Purchase A sends a message to Purchase B of trusted agent B requesting its merchant credential (steps 444–448). Ticket Holder B retrieves its merchant credential and sends the credential to A for validation (steps 450–456).

Credentials or any other type of ticket 8 are validated as follows:

1) Validate issuer certificate and check issuer signature.
2) Verify each transfer-match receiver and sender identifiers (i.e., $S_o$=Issuer, $R_o$=1st receiver, then $R_i=S_{i+1}$, $i \geq o$).
3) Validate each sender certificate and check each sender signature.
4) Verify that the last receiver identifier matches the identifier (TA(id)) of the certificate (cert(TA)) of the trusted agent in the current session.

Figure 12:
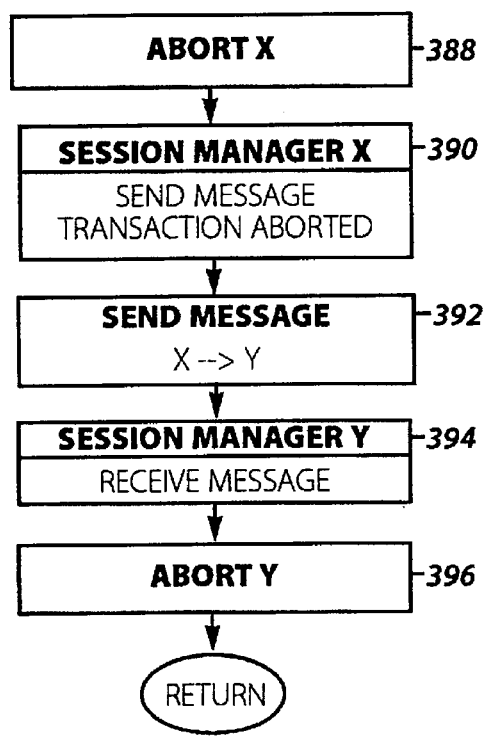
FIG. 12 illustrates an Abort Transaction protocol.
Figure 13A:
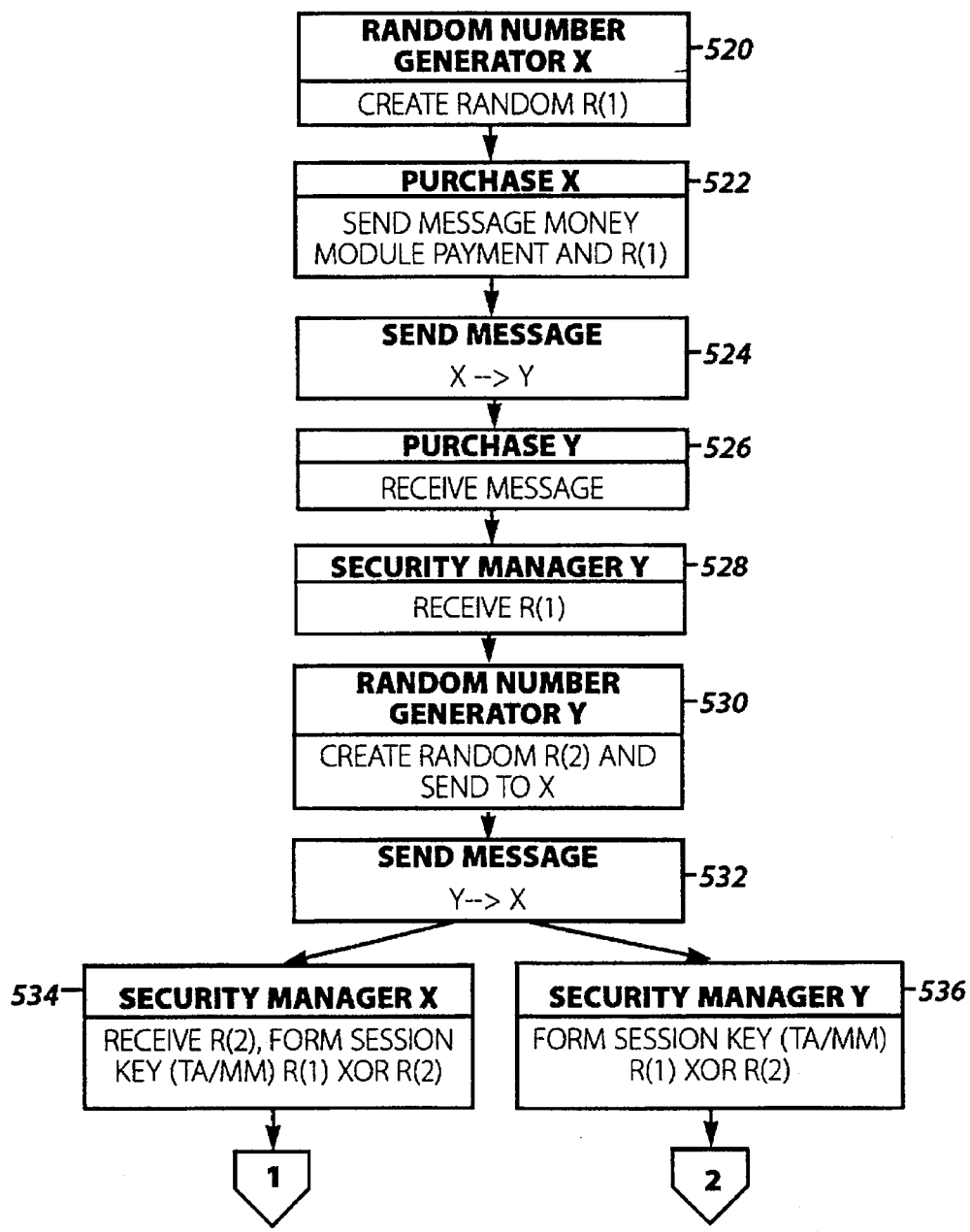
FIGS. 13A–13E illustrate a Money Module Payment protocol.
Figure 13B:
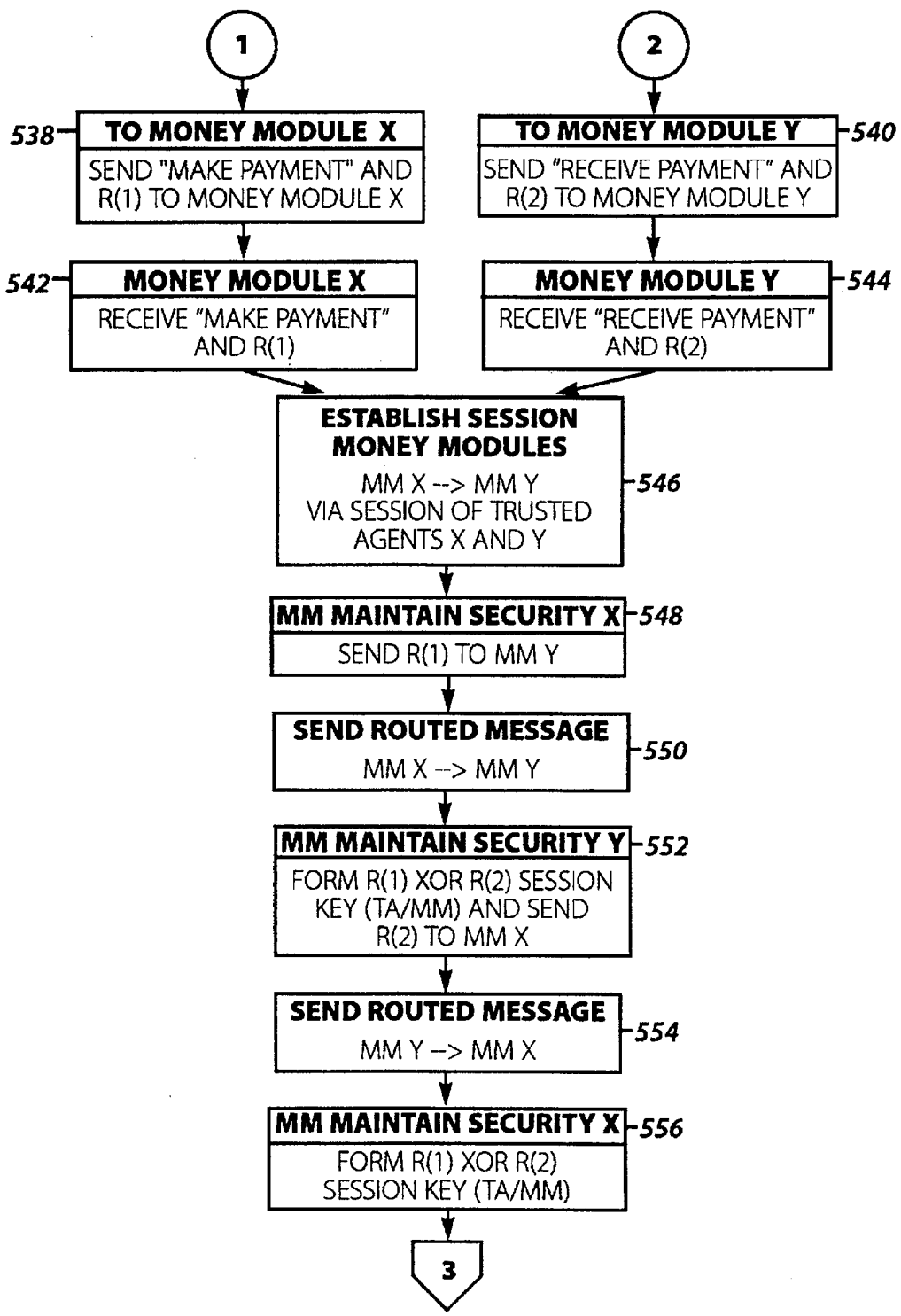
Figure 13C:
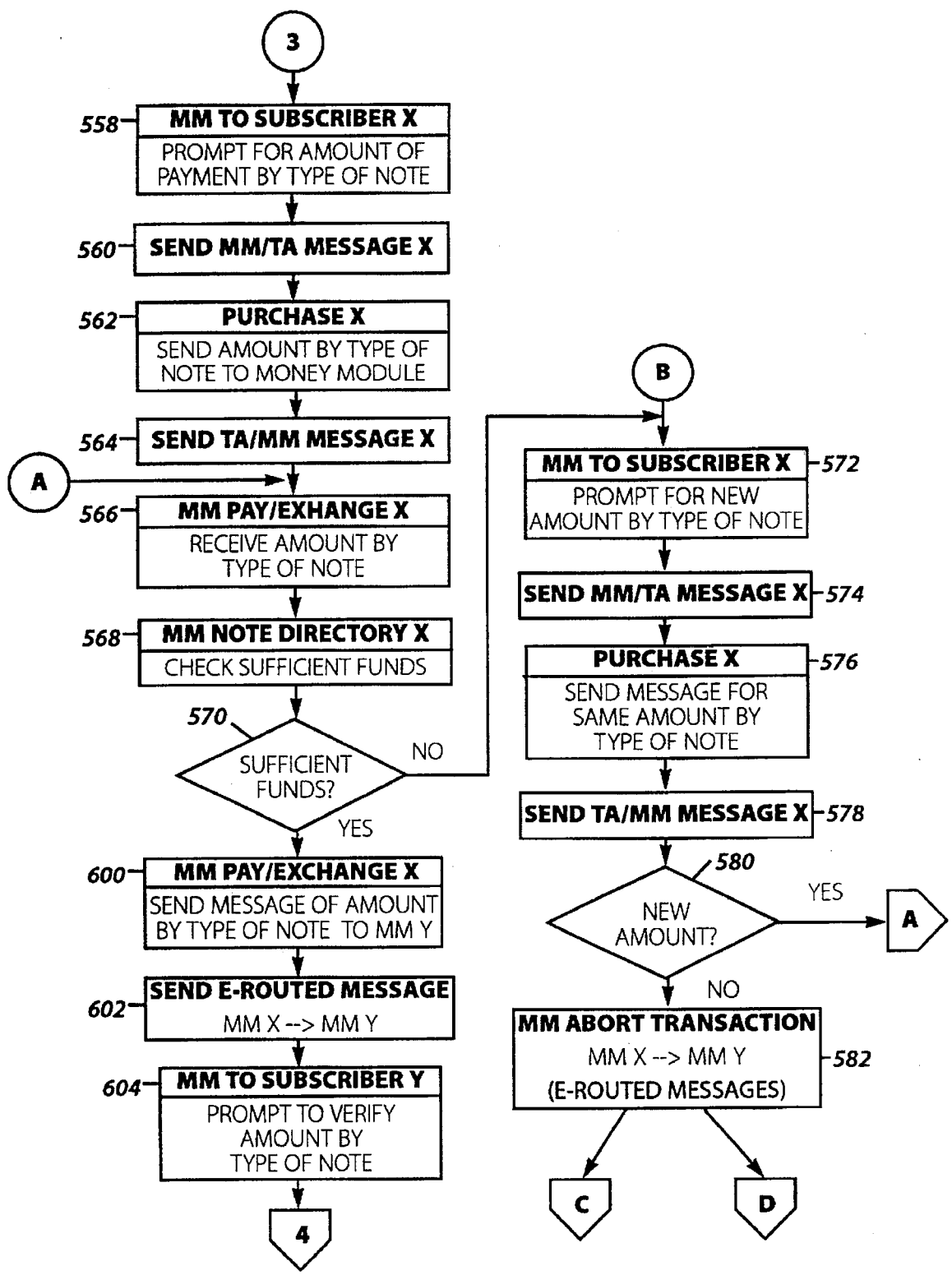
Figure 13D:
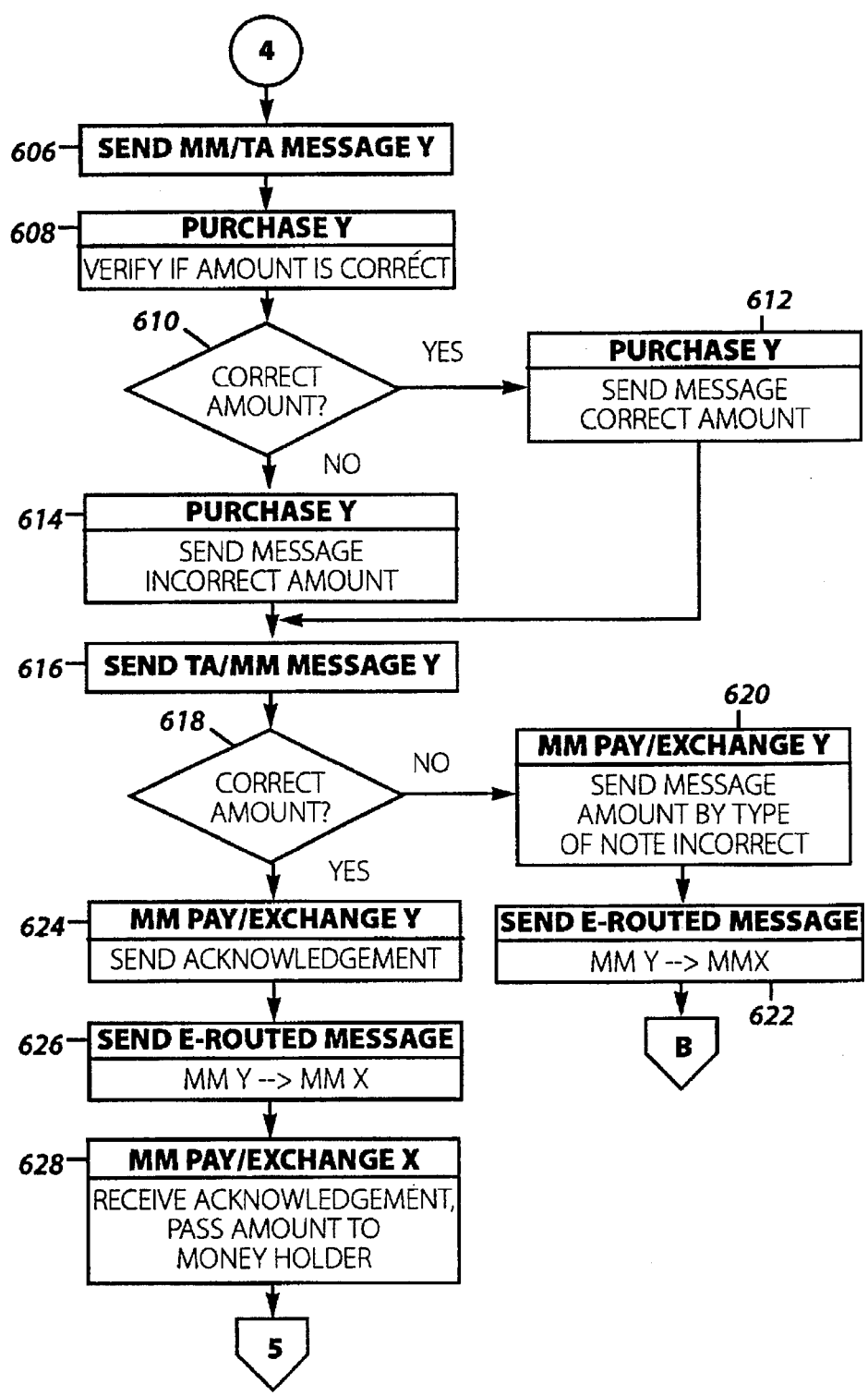
Figure 13E:
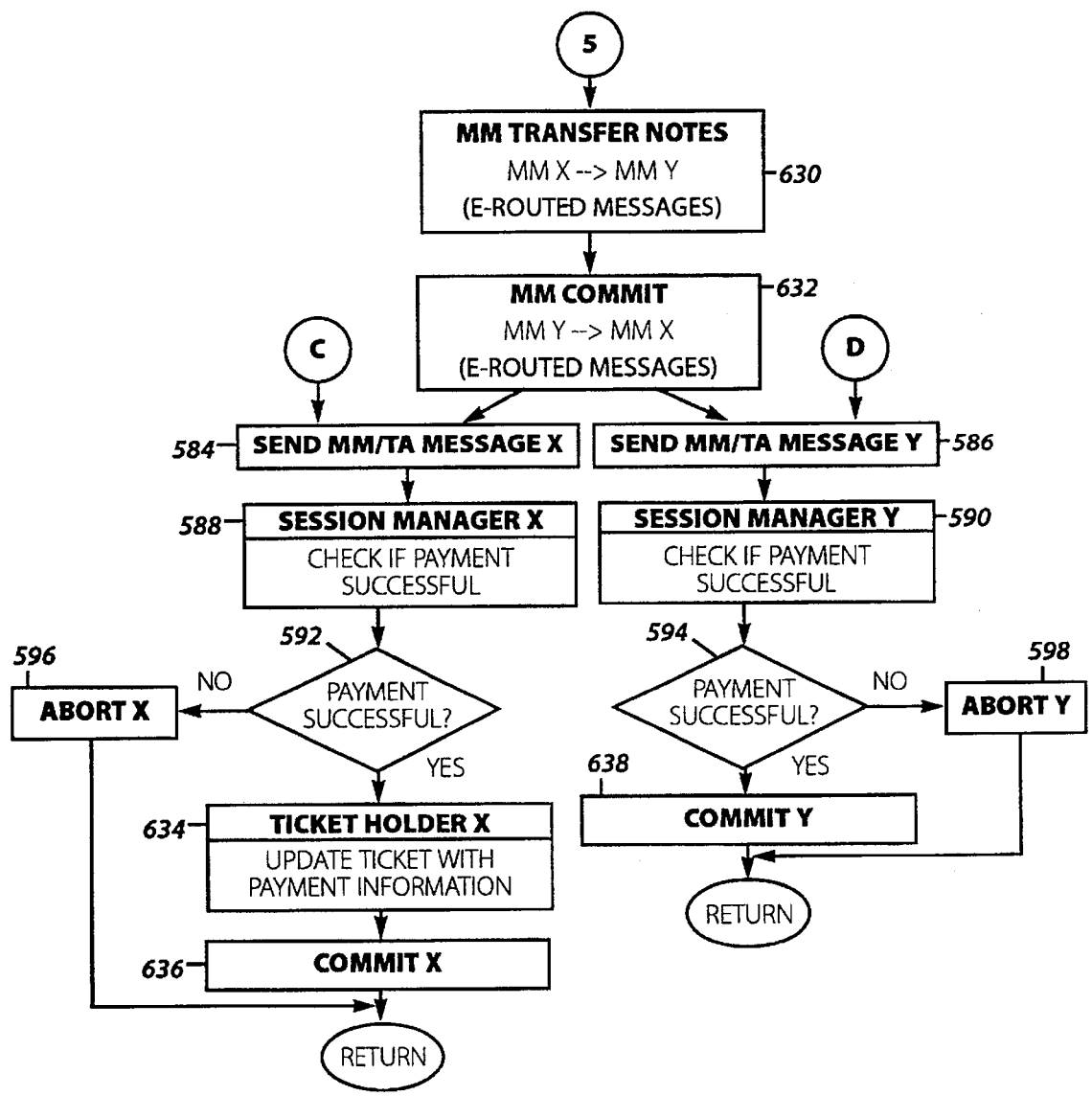

If the merchant's credential is not valid, then the transaction is aborted by calling the Abort Transaction subroutine (step 458). Referring to FIG. 12, trusted agent A aborts (step 388) and its Session Manager sends a message to trusted agent B's Session Manager informing B that A has aborted. (steps 390–394). Trusted agent B then aborts (step 396). Referring back to FIG. 11, if the merchant's credential is valid, then To Host A sends the credential information to a host transfer application for confirmation (e.g., confirmation of the merchant identity in the remittance advice by the host processor) (steps 460–462).

Referring again to FIG. 8, the flow for the commercial money module payment continues. Purchase A sends the message "Does B require A's credential?" to trusted agent B (steps 710–712). To Host B then sends the message "Require A's credential?" to HTB (steps 714–716). If the customer's credential is required to identify the payor then the check credential subroutine is executed and afterwards Purchase B sends a message to A to start payment (steps 718–724). If no credential is required, then Purchase B sends the message that A's credential is not required (steps 722–724). Trusted agent B's message is received by Purchase A (step 726) and To Host A requests the remittance advice from HTA (step 728). HTA then sends the remittance advice to trusted agent A (step 730) which is received by To Host A and sent to trusted agent B (steps 732 34).

Purchase B receives the remittance advice and validates the remittance advice total amount to the invoice amount(s) covered by the remittance advice (step 736). If the total amount is incorrect then the transaction is aborted (steps 738–740). If the total is correct, then Public Key B digitally signs the remittance advice and sends the signature to Ticket Holder B (step 742). Ticket Holder B creates a commercial payment ticket (step 744) and sends the ticket to A (steps 746–748).

Purchase A receives and validates the ticket (step 750). If invalid, then the transaction is aborted (steps 752–754). If valid, then Purchase A sends the ticket to Ticket. Holder A and sends the remittance advice signature for verification (step 756).

Public key A verifies the digital signature using the merchant's public key which was received along with the merchant's credential (step 758). If the signature is incorrect, then the transaction is aborted (steps 760, 754). If the signature is correct, then a money module payment is performed (steps 760–762).

Trusted agent A then performs a money module payment to trusted agent B as described in U.S. application Ser. No. 08/234,461. In particular, a Money Module Payment subroutine is called (step 762). Referring to FIG. 13, Random Number Generator A creates random number R(1) (step 520). Purchase A then sends a message to trusted agent B indicating that a "money module payment" will be made and also containing R(1) (step 522–524). Purchase B receives the message and sends R(1) to Security Manager B (steps 526–528). Random Number Generator B creates random number R(2) and sends it to trusted agent A (steps 530–532). Security Managers A and B both form session key (TA/MM) by exclusive ORing R(1) and R(2) (Steps 534–536).

Figure 14:
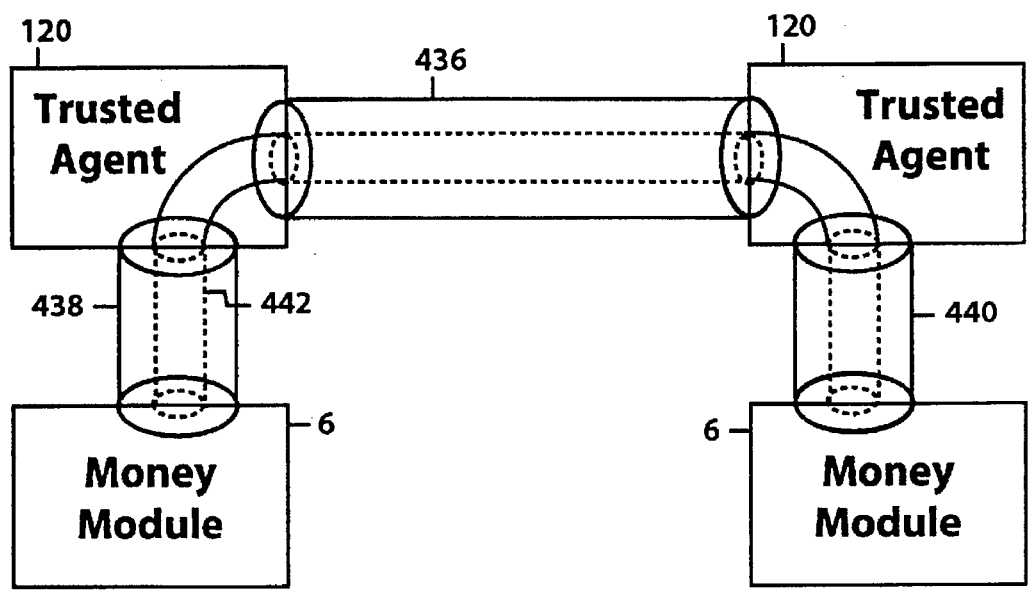
FIG. 14 shows the various message encryption layers established among trusted agents and money modules.
Figure 15A:
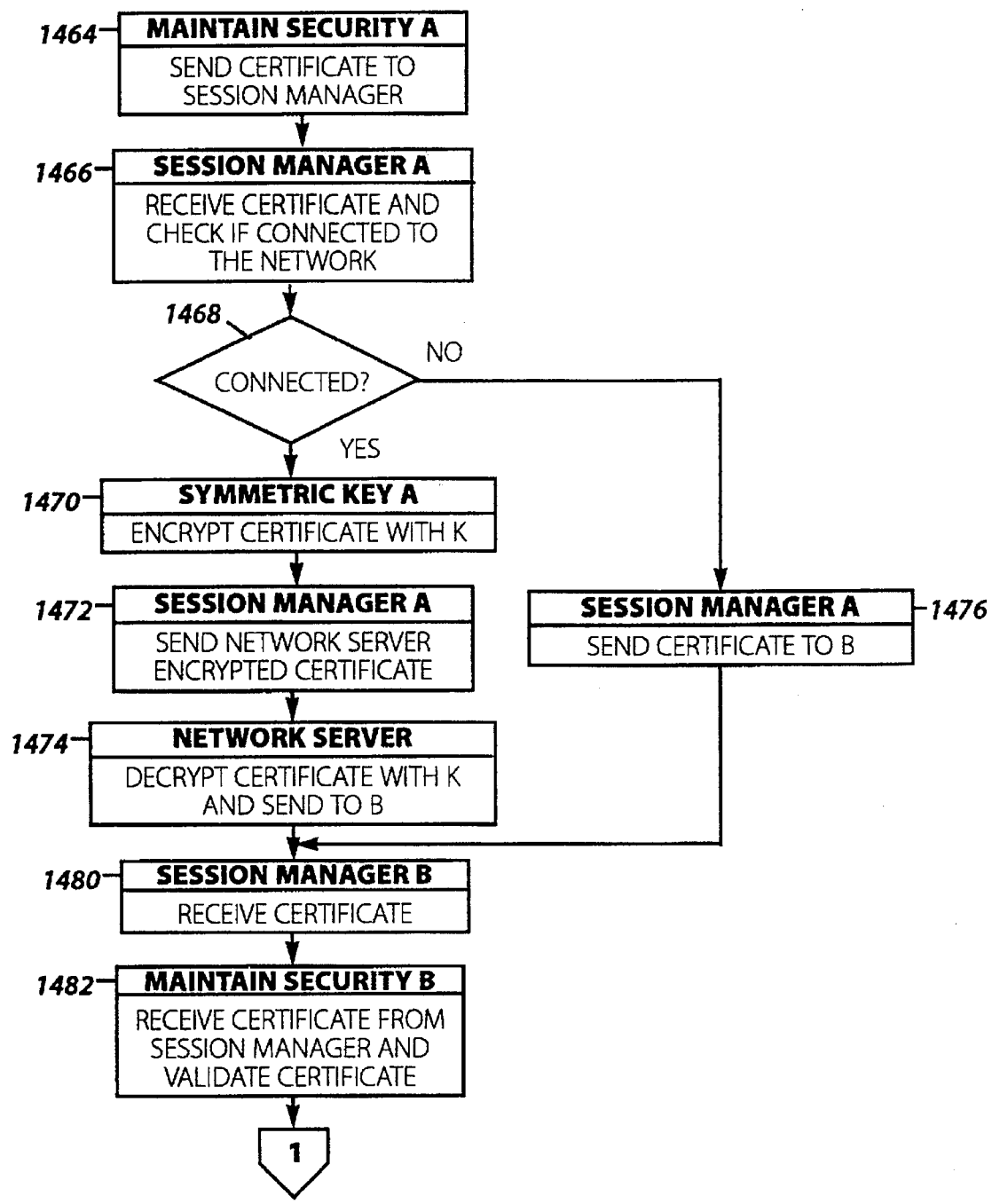
FIGS. 15A–15E illustrate an Establish Session protocol for money modules.
Figure 15B:
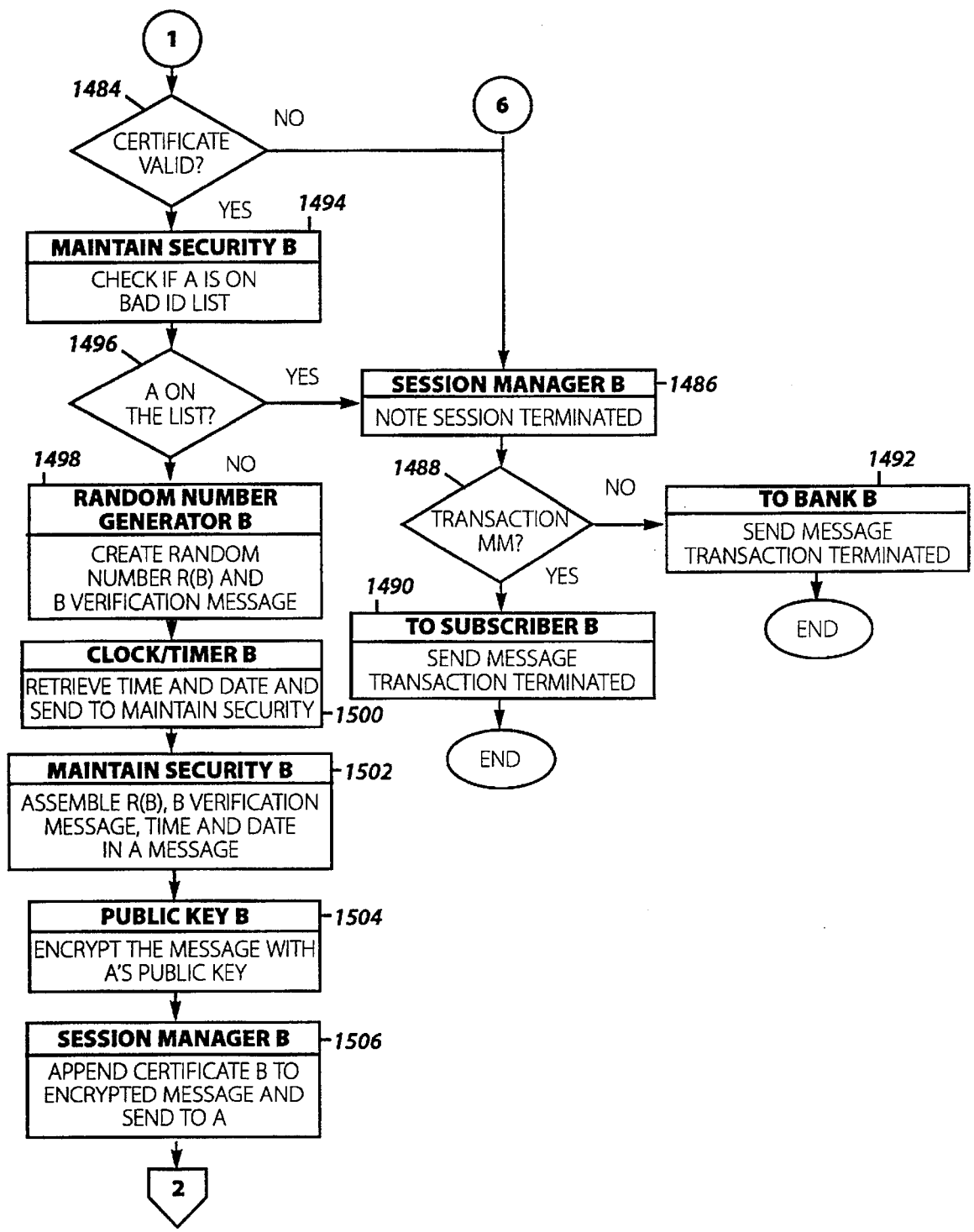
Figure 15C:
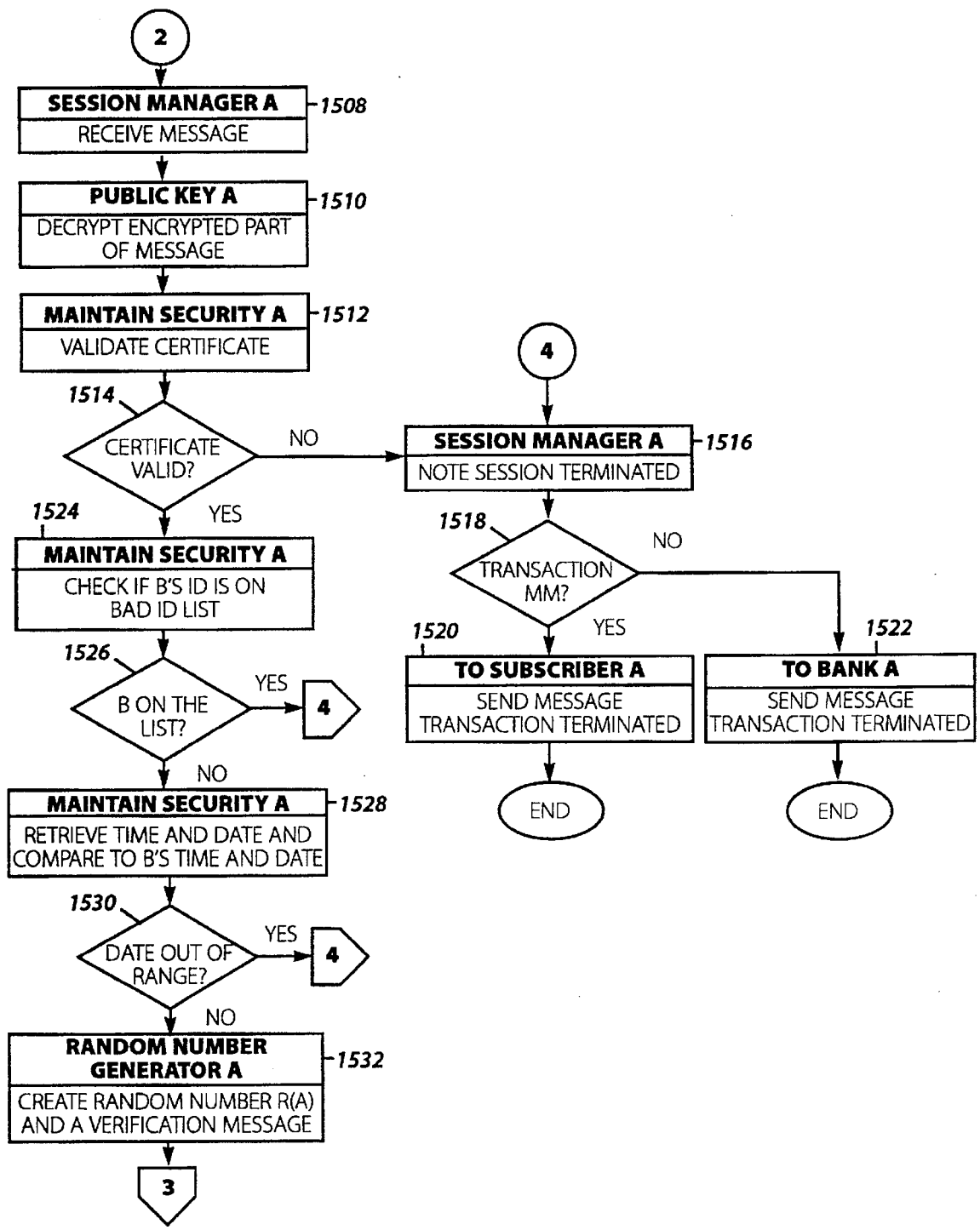
Figure 15D:
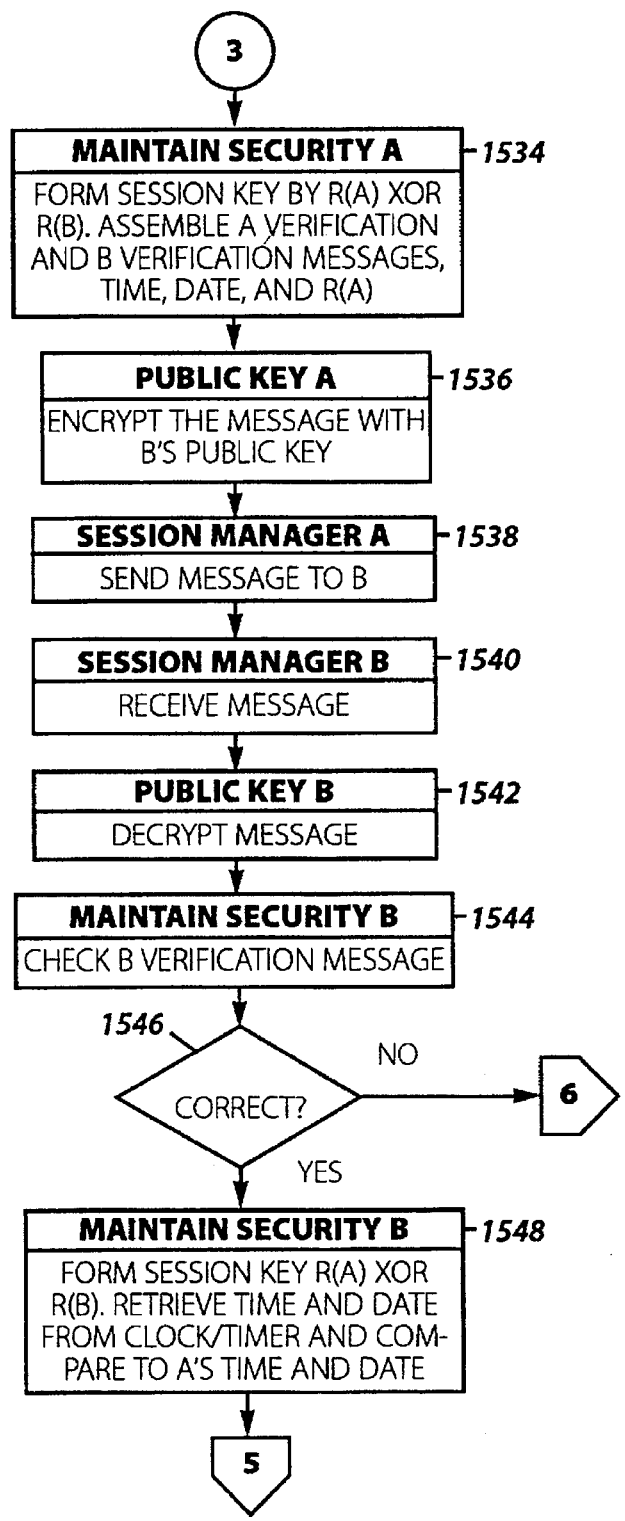
Figure 15E:
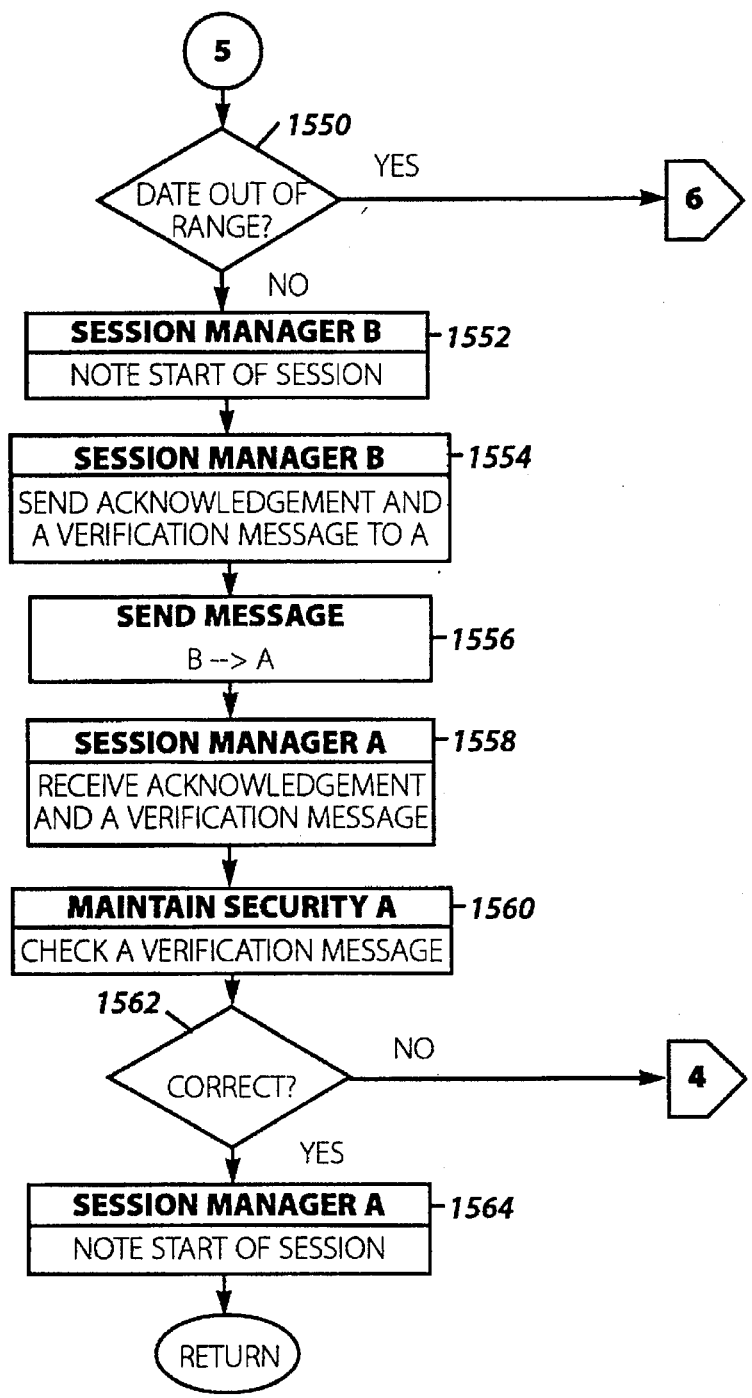

Referring to FIG. 14, there is shown four encryption channels established during a transaction. Encryption channel 436 between the two trusted agents 120 carries messages encrypted by session key (TA/TA). Channels 438 and 440 between a trusted agent 120 and its money module 6 share session key (TA/MM). Channel 442 between money modules 6 in different transaction devices 122 use session key (MM/MM).

Session key (TA/MM) is used for encrypting messages sent between a trusted agent 120 and its associated money module 6 via encryption channels 438 and 440. At the present point in the flow diagram, only the two trusted agents 120 have session keys (TA/MM). Both money modules 6 will later in the flow diagram form copies of session key (TA/MM) so as to enable encrypted communication between the trusted agents 120 and their money modules 6.

It may be noted that instead of the trusted agent 120 and money module 6 being embodied as discrete tamper-proof components, they may be fabricated as one tamper-proof module. In this case, it would not be necessary to establish a secure session for communication between trusted agent 120 and money module 6 in the same transaction device 122. However, discrete money modules 6 and trusted agents 120 are preferable in that such a configuration allows for greater application flexibility.

Referring back to FIG. 13, To Money Module A sends a "Make Payment" message and R(1) to its associated money module A. Also, To Money Module B sends a "Receive Payment" message and R(2) to its associated money module B (steps 538–544).

At this stage, money module A (within the CTA 2) and money module B (within the MTA 4) establish a session between them so that each money module 6 winds up holding new session key (MM/MM) (step 546). In establishing this money module to money module session, the money modules exchange messages via the pre-existing trusted agent's session. Referring to FIG. 14, the session key for encryption channel 442 is formed by exchanging messages encrypted by channel 436. After the money module session is established, messages sent between money modules will be encrypted twice, by both session key (MM/MM) and session key (TA/TA), along the portion of the communication path between trusted agents 120.

In the preferred embodiment, the money module session is established in a manner similar to the establishment of a trusted agent session. The money modules 6 would therefore hold their own certificates containing their public keys. The swapping of certificates and random numbers (for XORing) enables the secure creation of session keys (MM/MM). The Establish Session protocol used by money modules is described in U.S. application Ser. No. 08/427,287 and is shown in FIG. 15. Maintain Security A sends the module certificate to the session manager, and Session Manager A receives the certificate and checks if money module A is connected to the network (steps 1464–1466). If money module A is not connected to the network, then Session Manager A sends the certificate received from Maintain Security A to destination B (step 1476).

Alternatively, if money module A is connected to the network, then Symmetric Key A encrypts the certificate with K and Session Manager A sends the encrypted certificate to the network server (step 1468–1472). The Network Server decrypts the certificate with K and sends the certificate to destination B.

Regardless of whether the certificate was sent by the Network Server or by Session Manager A, Session Manager B receives the certificate and Maintain Security B (if B is a security server, then this function is performed by the Session Manager) validates the certificate (steps 1480–1482). If the certificate is not valid, then Session Manager B notes the session is terminated and informs either the subscriber or the bank (steps 1486–1492) (if B is a security server, then B merely notes the transaction is terminated).

If the certificate is valid, then Maintain Security B checks if A is on the bad id list (steps 1494–1496). If A is on the list, then the session is terminated. If A is not on the list, then Random Number Generator B creates random number R(B) and a B verification message (step 1498). Clock/Timer B retrieves the time and date (step 1500). Maintain Security B assembles R(B), B verification message and time and date in a message (step 1502). Public Key B encrypts the message with A's public key and Session Manager B appends B's certificate to the encrypted message and sends the message to A (steps 1504–1506).

Session Manager A receives the message, Public Key A decrypts the encrypted part of the message, and Maintain Security A validates B's certificate (steps 1508–1514). If the certificate is not valid, then Session Manager A notes the termination of the session and informs either the subscriber or the bank (steps 1516–1522). If the certificate is valid, then Maintain Security A checks if B is on the bad id list (steps 1524–1526). If B is on the list, then the session is terminated. If B is not on the list, then Maintain Security A retrieves the date and time and compares it to B's date and time (steps 1528–1530). If the date and time are out of range, then the session is terminated.

If the date and time are in range, then Random Number Generator A creates random number R(A) and an A verification message (step 1532). Maintain Security A then forms a session key by the operation R(A) XOR R(B) (step 1534). The A verification message, the B verification message, the time, date and R(A) are assembled into a message and encrypted with B's public key (step 1536). The message is sent to B by Session Manager A (step 1538). Session Manager B receives the message, Public Key B decrypts the message and Maintain Security B checks the B verification message (steps 1540–1546). If the B verification message is incorrect, the session is terminated. If the B verification message is correct, then Maintain Security B forms the session key by R(A) XOR R(B) (step 1548). The time and date are retrieved and compared to A's time and date to check if they are within a predefined range of each other (step 1550). If the time and date are out of range, then the session is terminated. If the time and date are in range, then Session manager B notes the start of the session (step 1552).

Session Manager B then sends an acknowledgement and the A verification message to A (steps 1554–1556). Session Manager A receives the message and Maintain Security A checks the A verification message (steps 1558–1562). If the verification message is not correct, the session is terminated. If the verification message is correct, then Session Manager A notes the start of the session (step 1564).

The overall system security pertaining to the money modules may be integrated with that for the trusted agents 120, but is preferably separate to provide for enhanced system security and system flexibility.

Referring back to FIG. 13, money module A sends R(1) to money module B. This function may be initiated by a MM Maintain Security A application residing in money module A (step 548). This application and other money module applications are prefaced by the designations "MM" and are described in commonly assigned U.S. patent application Ser. No. 07/794,112 together with any modifications and/or additions disclosed in U.S. application Ser. No. 08/234,461.

Figure 16:
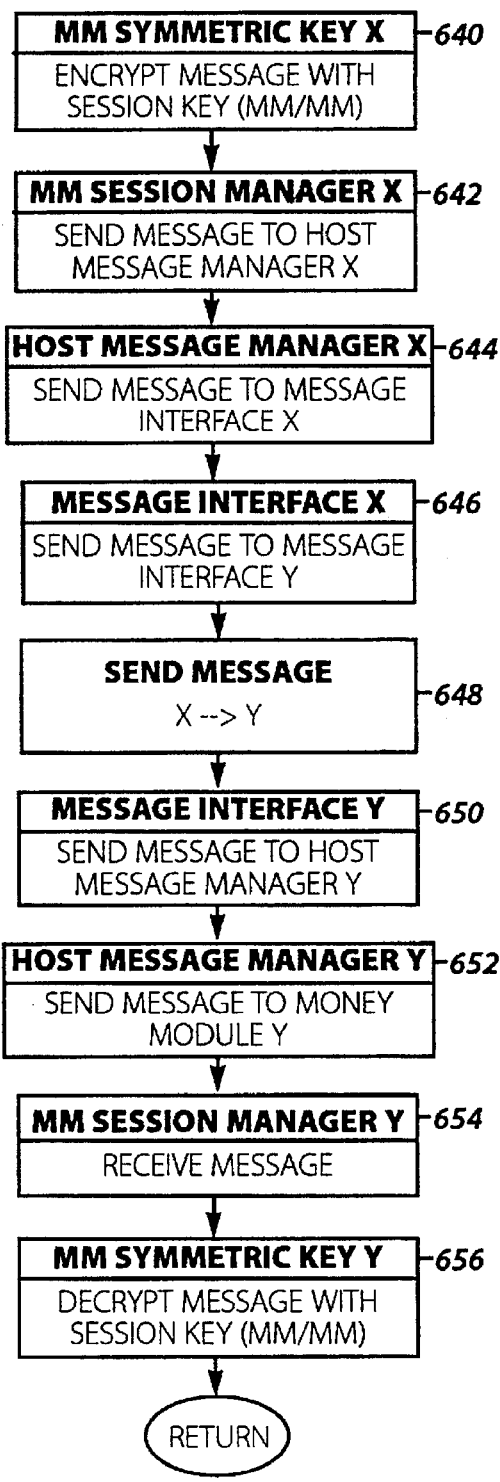
FIG. 16 illustrates a Send Routed Message protocol.

Random number R(1) is sent from money module A to money module B by the subroutine Send Routed Message (step 550). Referring to FIG. 16, MM Symmetric Key A encrypts the message (including R(1)) with session key (MM/MM) (step 640). MM Session Manager A sends the message to Host Message Manager A which, in turn, sends the message to Message Interface A of trusted agent A (steps 642–646). Trusted agent A then sends the message to Message Interface B of trusted agent B using the Send Message subroutine (step 648) which encrypts and decrypts the message with session key (TA/TA) in between the trusted agents. Message Interface B then sends the message to MM Session Manager B in money module B via Host Message Manager B (steps 650–654). Finally, MM Symmetric Key B decrypts the message with session key (MM/MM) (step 656).

Referring again to FIG. 13, MM Maintain Security B (in money module B) forms session key (TA/MM) by exclusive ORing R(1) and R(2). Money module B then sends R(2) to money module A which also forms session key (TA/MM) by exclusive ORing R(1) and R(2) (Steps 552–556). Referring to FIG. 14, at this stage, three session keys exist: (MM/MM), (MM/TA), and (TA/TA). Thus, the four encryption channels shown are in place.

Referring to FIG. 13, MM To Subscriber A prompts trusted agent A for the amount of payment by type of note (e.g., dollars, yen, pounds, etc.) (step 558). A money module as described in U.S. patent application Ser. No. 07/794,112, incorporated by reference herein, would generally use the To Subscriber application for communication with the owner/holder of the money module. However, as used in the present instance, the To Subscriber application communicates with the trusted agent 120 for getting various instructions. Here, the trusted agent 120 delivers amount of payment and type of note information (trusted agent A has previously communicated with the owner/holder of the CTD 2 to determine the amount).

Figure 17:
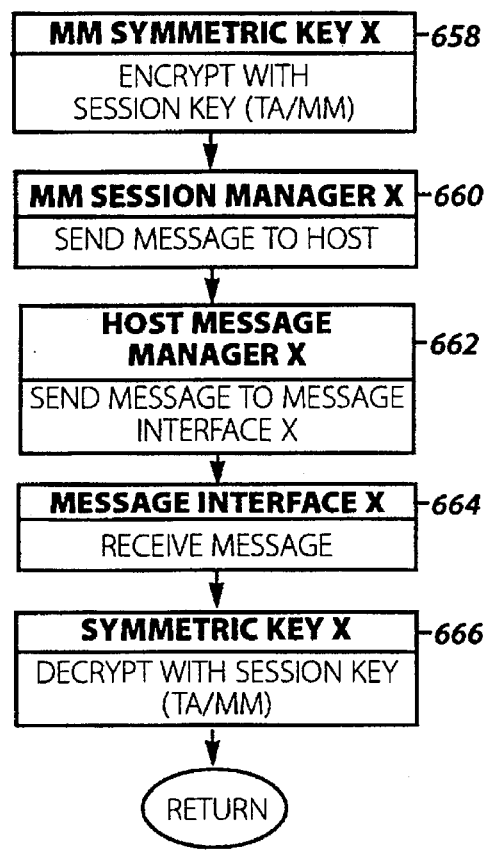
FIG. 17 illustrates a Send MM/TA Message protocol.
Figure 18:
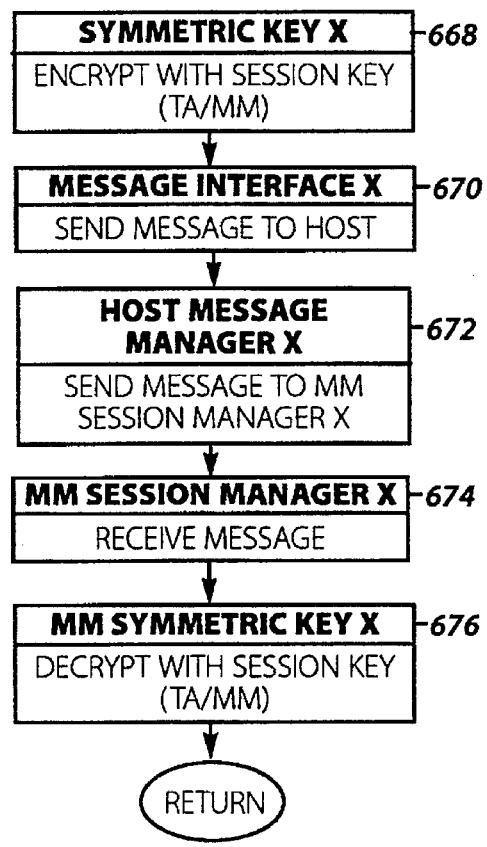
FIG. 18 illustrates a Send TA/MM Message protocol.

The prompt from the money module 6 to the trusted agent 120 is sent via the Send MM/TA Message subroutine (step 560). Referring to FIG. 17, MM Symmetric Key A encrypts the message with session key (TA/MM) (step 658). MM Session Manager A sends the message to trusted agent A's Message Interface via Host Message Manager A (steps 660–664). Symmetric Key A decrypts the message with session key (TA/MM) (step 666). Referring back to FIG. 13, Purchase A of trusted agent A sends the amount (price of selected merchandise) by type of note to MM Pay/Exchange A of money module A (steps 562–566). This message is sent via the Send TA/MM Message subroutine (step 564). Referring to FIG. 18, Symmetric Key A encrypts the message with session key (TA/MM) (step 668). Message Interface A sends the message to money module A's MM Session Manager via Host Message Manager A (steps 670–674). Finally, MM Symmetric Key A decrypts the message with session key (TA/MM) (step 676).

Referring to FIG. 13, MM Note Directory A checks if the money module 6 has sufficient funds to cover the payment (steps 568–570). If insufficient, then money modules A and B abort the transaction (steps 572–582).

Figure 19A:
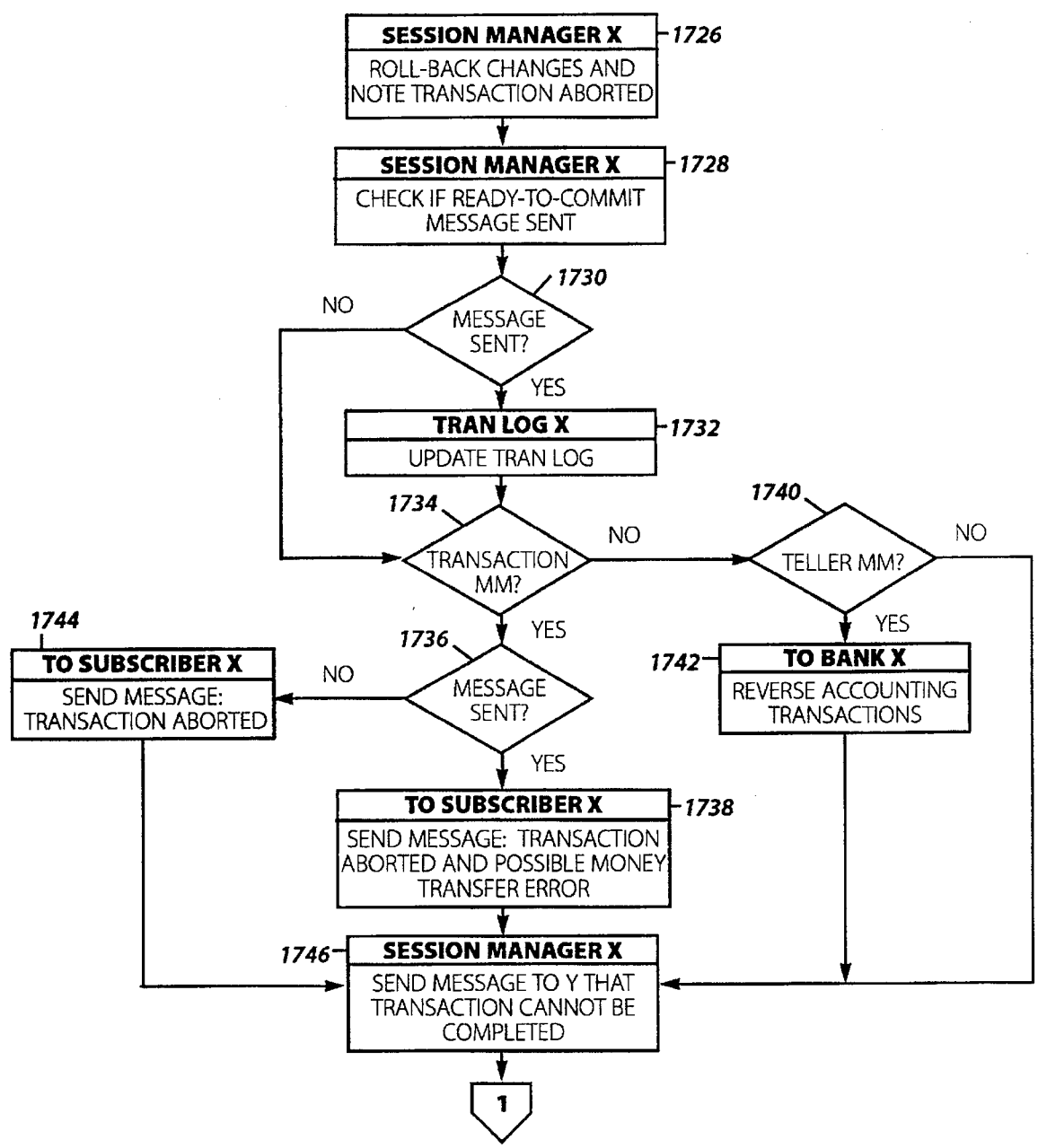
FIGS. 19A–19B illustrate an Abort Transaction protocol for money modules.
Figure 19B:
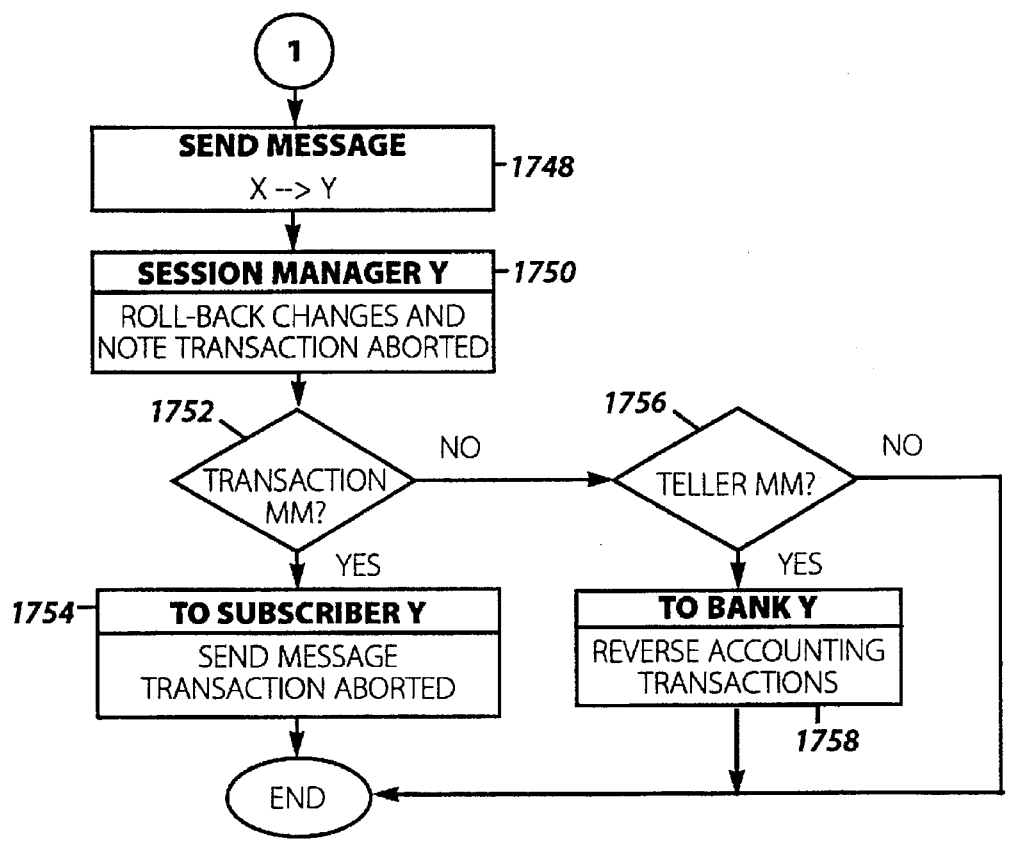

The MM Abort transaction protocol (step 582) may be that of the preferred electronic monetary system as described in U.S. application Ser. No. 08/427,287 and shown in FIG. 19. Session Manager X rolls-back changes and notes that the transaction is aborted (step 1726). Session Manager X then checks if the "Ready-to-Commit" message has been sent (steps 1728–1730). If so, then X updates its transaction log (step 1732) by recording that X committed after sending a Ready-to-Commit message and recording the note identifiers and amounts of each note received during the Transfer Notes protocol. Thus, the abort protocol logs information when the Abort subroutine is called during a failed Commit subroutine.

If X is a transaction money module 1186, and the Ready-to-Commit message was sent, then To Subscriber X informs its subscriber that the transaction was aborted and that there may have been a money transfer error (steps 1734–1738).

If X is a teller money module 1188, then To Bank X informs the bank that it should reverse its accounting transactions (by appropriate debits and credits) (steps 1740–1742). If X is a transaction money module 1186 and no Ready-to-Commit message has been sent, then To Subscriber X informs the subscriber that the transaction was aborted (step 1744).

In any event, Session Manager X then sends Y a message that the transaction cannot be completed (steps 1746–1748).

Session Manager Y rolls-back its changes and notes the transaction as aborted (step 1750). Y then informs its subscriber that the transaction is aborted (steps 1752–1754) or informs the bank to reverse its accounting transaction (steps 1756–1758).

As described, if a transaction is interrupted during a commit protocol, it is possible that notes will be lost. If this occurs, the transferee will have aborted and the transferor will have committed to the transfer of notes. In this case, the transferee money module records information about the notes it should have received and notifies the subscriber that there is a potential problem (i.e. it did not receive the notes sent by A). It may be noted that in this circumstance, as far as the transferor money module is concerned, it properly transferred the notes.

The transferee money module subscriber can then make a claim for the money to the Certification Agency. The claim information would include the log record of the failed transaction. The Certification Agency could then check with issuing banks to see if the notes have been reconciled. After some period of time, if the notes have not been reconciled, the subscriber could reclaim his money.

Figure 20:
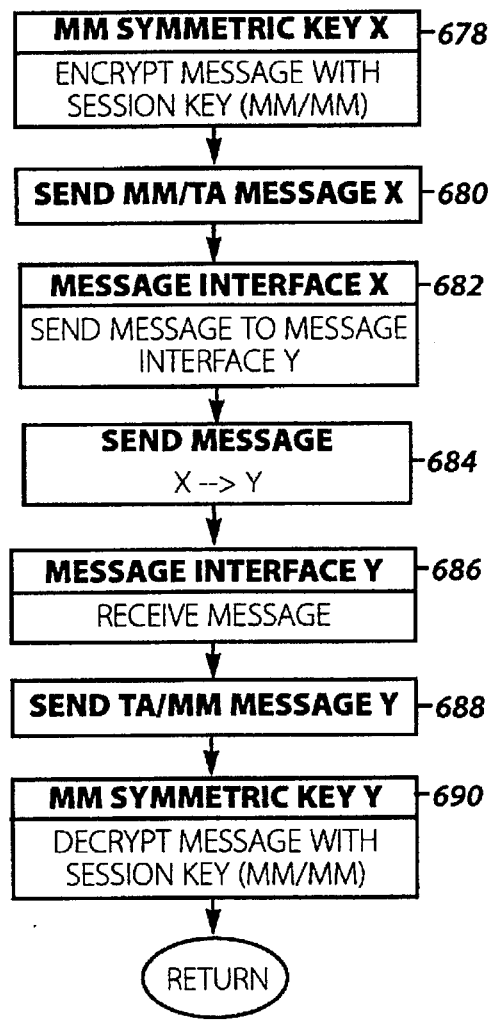
FIG. 20 illustrates a Send E-Routed Message protocol.

Referring again to FIG. 13, the messages between money module A and money module B are sent via a Send E-Routed Message subroutine which utilizes all three session keys (MM/MM), (TA/MM), and (TA/TA). Referring to FIG. 20, MM Symmetric Key A encrypts a message with session key (MM/MM) (step 678). The message is then double encrypted by session key (MM/TA) before it is sent to trusted agent A. Once received by trusted agent A, the message is decrypted by session key (MM/TA). (Step 680). Message Interface A then sends the message to Message Interface B (steps 682–684). In between trusted agents 120, the message is double encrypted by session key (TA/TA). In like manner, Message Interface B sends the message to MM Symmetric Key B for final decrypting (steps 686–690). FIG. 14 illustrates the various encryption layers.

Referring again to FIG. 13, during the abort routines of money modules A and B (step 582), they generate messages sent to their trusted agents A and B, respectively (steps 584–586) informing them that they have aborted the transaction and hence that payment was unsuccessful. Session Managers A and B note that the payment was unsuccessful and consequently trusted agents A and B abort (steps 588–598).

If, on the other hand, the customer's money module 2 has sufficient funds then MM Pay/Exchange A sends a message to the merchant's money module containing the amount of money to be transferred in payment and the type of notes (step 600). This message is sent by the Send E-Routed Message subroutine (step 602).

Money module B receives the message containing the payment amount according to money module A. MM To Subscriber B then sends a prompt to trusted agent B to verify this payment amount (steps 604–606). Accordingly, Purchase B in trusted agent B verifies if the amount is correct (steps 608–610). If correct, then trusted agent B sends a "Correct Amount" message to money module B. If incorrect, then an "Incorrect Amount" message is sent. (Steps 612–616). In the event of an "Incorrect Amount" message, money module B informs money module A which, in turn, requests its trusted agent to resend a new amount or else abort (steps 618–622, 572–582). In money module payments made during an electronic merchandise purchase, the trusted agent will not send a new amount and hence both money modules 6 and both trusted agents 120 will abort.

If, on the other hand, money module B receives a "Correct Amount" message from its trusted agent, then money module B sends an Acknowledgement message back to the customer's money module (steps 624–626). When MM Pay/Exchange A receives the Acknowledgement message, it then passes the amount to Money Holder A (the application which contains and manages the electronic representations of money) (step 628).

Note that the payor initiated protocol just described may instead be implemented as a payee initiated payment as in the POS Payment protocol. In such a protocol, the merchant's trusted agent instructs its money module as to the payment amount it expects to receive, this payment information is sent to the customer's money module which prompts its trusted agent for verification, and if the amount is correct, then the customer's trusted agent informs its money module.

Figure 21A:
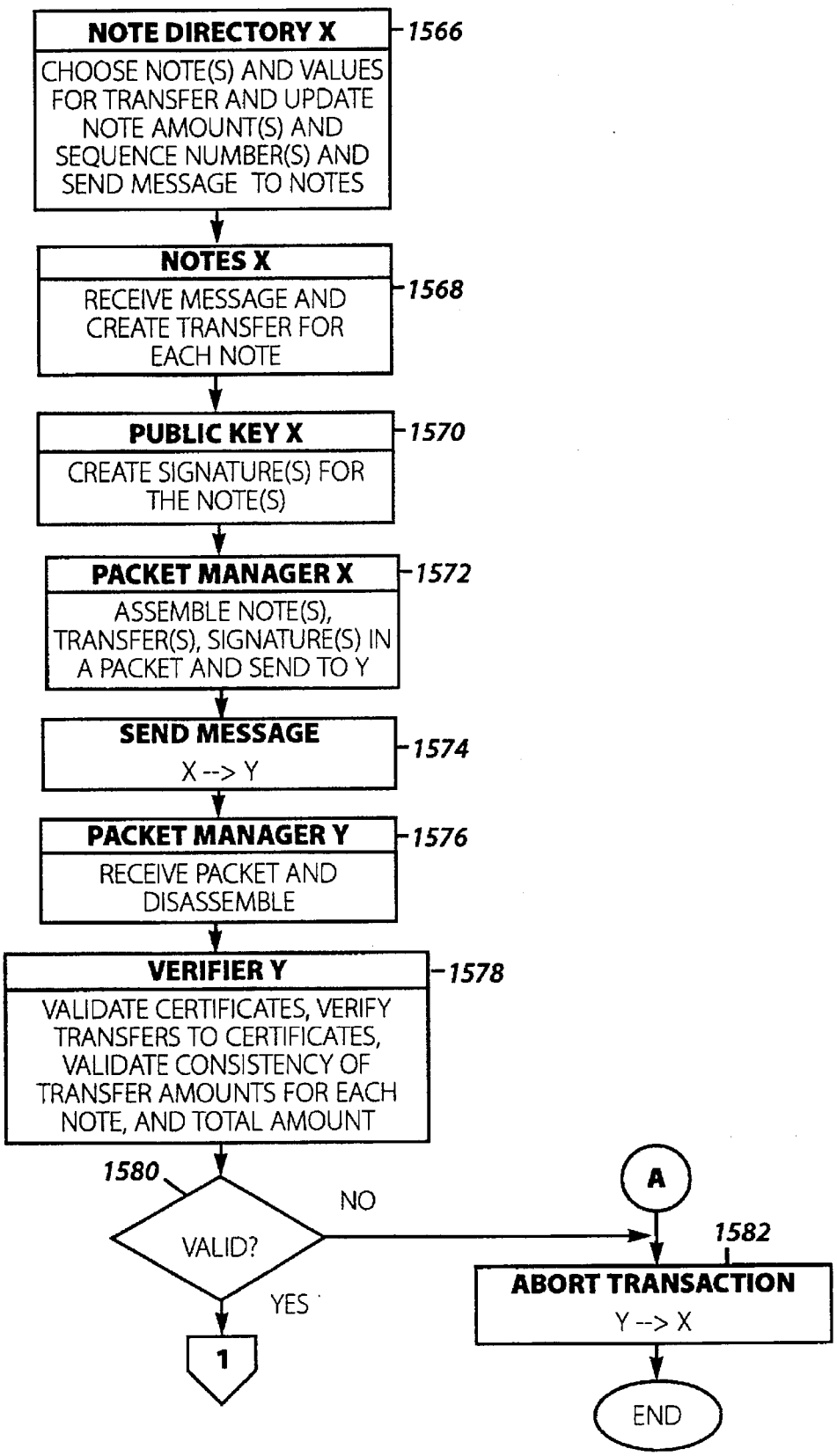
FIGS. 21A–21B illustrate a Transfer Notes protocol.
Figure 21B:
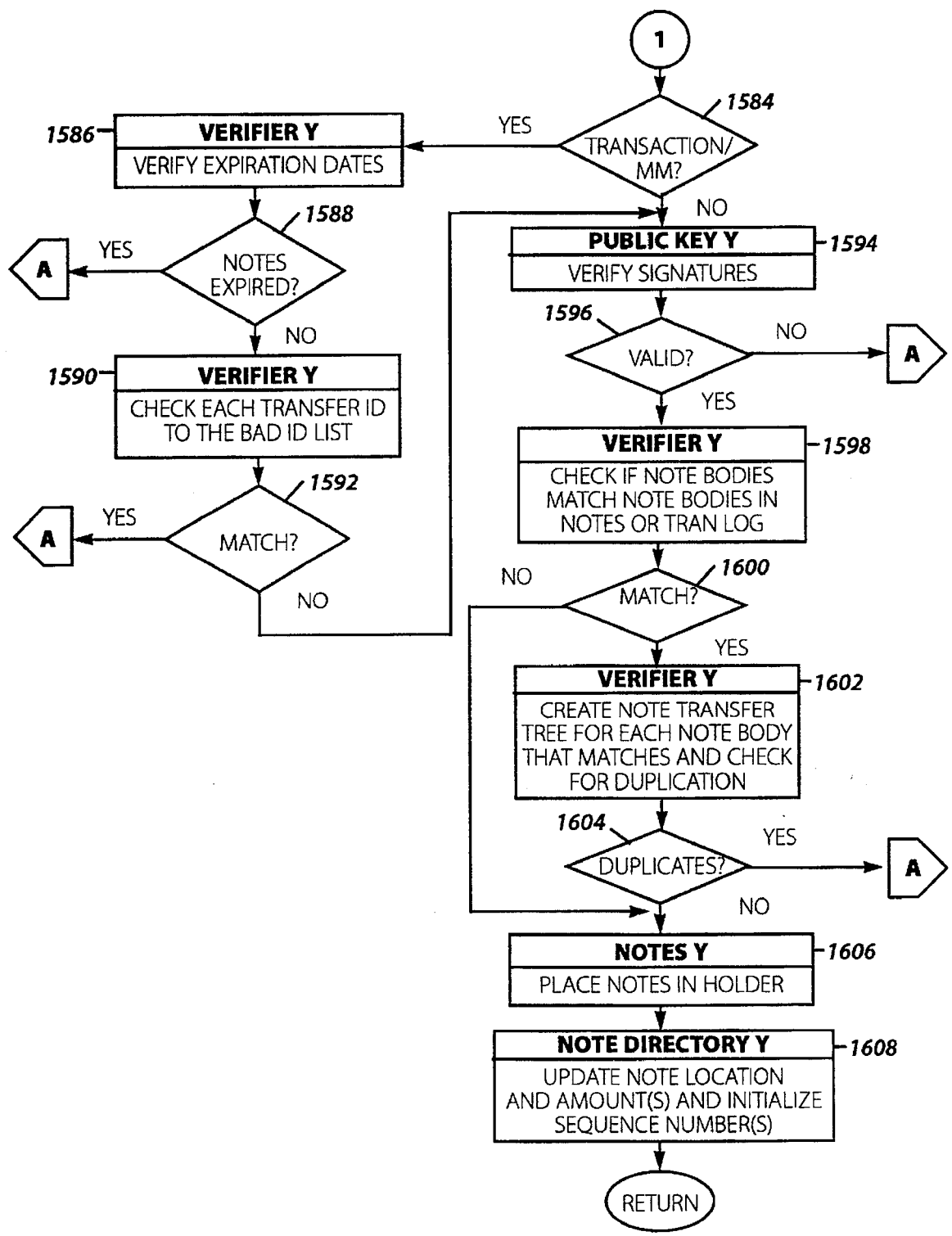

Referring again to FIG. 13, the customer's money module A then transfers electronic notes in the amount specified to the merchant's money module 4 via the E-Routed message path (step 630). FIG. 21 shows a Transfer Notes protocol as described in U.S. application Ser. No. 08/427,287. Note Directory X chooses the note(s) and values for transfer, updates the note amount(s) and sequence number(s), and then sends the message to Notes (step 1566). Possible objectives in choosing the notes for transfer may, for example, be: (1) minimize the number of digital signatures (which requires processing time); (2) minimize the size of the packet; (3) maximize the usefulness of the electronic notes left to the transferring subscriber (i.e., pass the notes with the shortest time left until expiration). Such objectives may be achieved by the following note transfer algorithm: (1) determine all possible alternatives which contain the least number of notes; (2) determine which of these alternatives have the least number of transfers; (3) if more than one choice is left from step 2, choose the one which has the least number of monetary unit days. Monetary-unit days= residual value of note to be transferred times the number of days left until the note expires, summed for all the notes in the packet.

Notes X, upon receiving the message from Note Directory X, creates a transfer to be appended to each note being transferred (step 1568). Public Key X creates signatures for the note(s) (step 1570). Packet Manager X then assembles the note(s) with their new transfer(s) and signature(s) in a packet and sends the packet to Y (steps 1572–1574). Packet Manager Y receives the packet and disassembles it (step 1576).

Verify Y validates all certificates in the note(s) (e.g., money generator certificate and all transfer certificates). Then Verify Y verifies that the identification numbers in the transfer group match up with the module identification numbers of the certificates in the signature and certificate group throughout the history of the electronic note. Also, the consistency of the transfer amounts for each note is validated by ensuring that throughout the electronic note history the amount transferred in each successive transfer is less than that of the immediately precedent transfer. In addition, the total amount transferred is checked to ensure it is the amount expected. (Steps 1578–1580). If not valid, then the transaction is aborted (step 1582).

If valid and Y is a transaction money module, then Verifier Y verifies the expiration dates of the note(s) (steps 1584–1588). If any of the note(s) have expired, then the transaction is aborted. If none have expired, then Verifier Y checks each id from the note transfers against the bad id list (steps 1590–1592). If any of the transfer id's are on the bad id list, then the transaction is aborted.

If the transfer id's are not on the bad id list (or Y is not a transaction money module), then Public Key Y verifies the validity of the note(s) signatures (steps 1594–1596). If any of the signatures are not valid, then the transaction is aborted. If the signatures are valid, then Verifier Y checks if the note(s) bodies match note bodies that are stored by the Notes application or located in the Tran Log (steps 1598–1600). For each note body that matches, a note transfer tree is created in order to determine whether there has been any note duplication (steps 1602–1604). If any of the notes have been duplicated, then the transaction is aborted. This check for duplication (i.e., steps 1598–1604) is particularly directed to, and well suited for, thwarting individuals who attempt to create money by transferring notes by "self-dealing" using a compromised transaction money module.

If there are no duplicates, or if no matches of note bodies were identified, then Notes Y places the note(s) in the money holder (step 1606). Finally, Note Directory Y updates the note(s) location(s) and amount(s), and also initializes sequence number(s) (step 1608).

It may be understood that the Transfer Notes process includes steps for updating and initializing a sequence number to facilitate note reconciliation, checking if the transferee of any note is on the bad id list, and checking for note duplication. These additional features and steps make it difficult for adversaries to introduce and circulate duplicated notes, and enhance the ability to detect duplicated notes in circulation.

Figure 22:
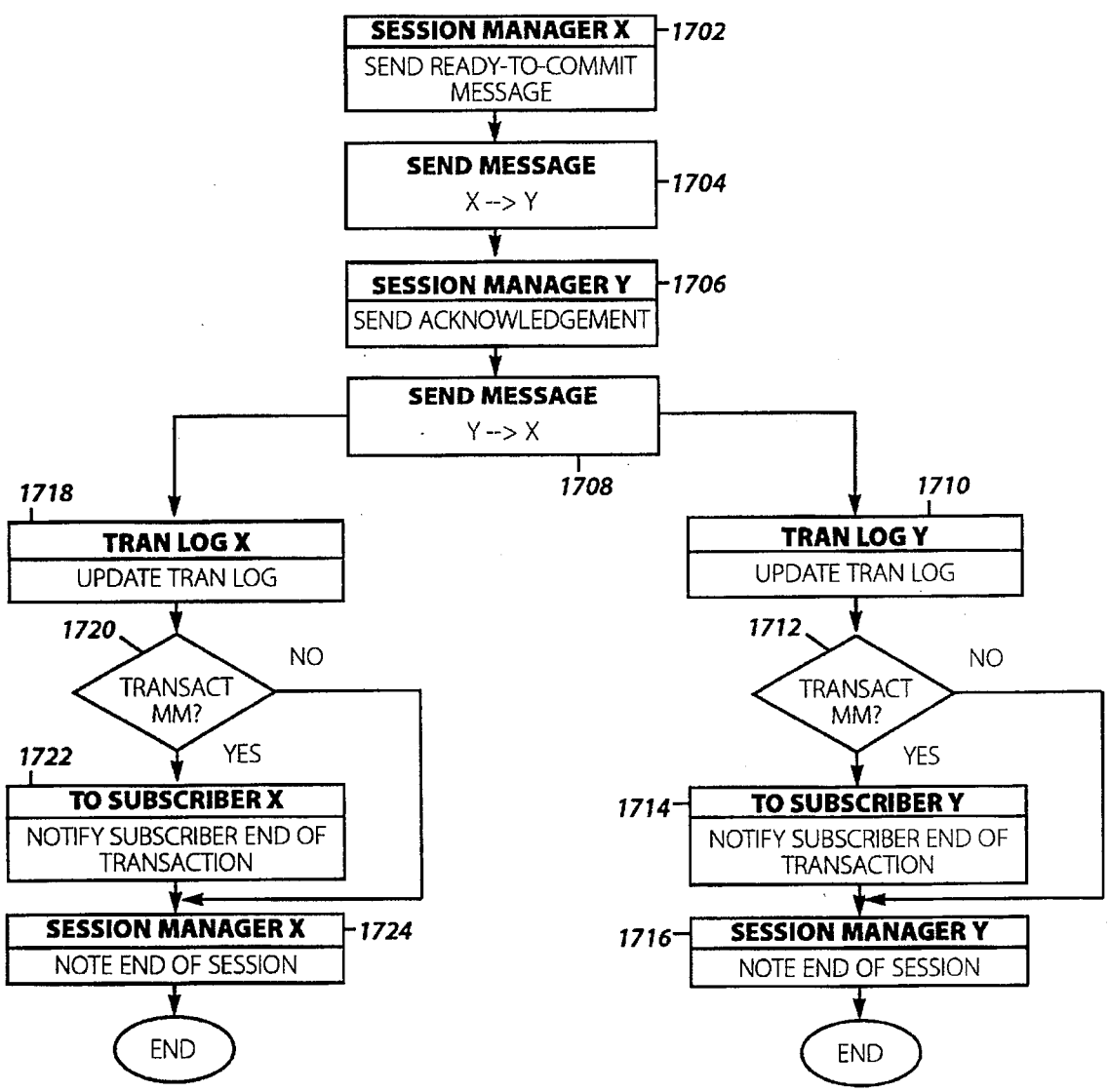
FIG. 22 illustrates a Commit protocol for money modules.

Referring back to FIG. 13, a MM Commit subroutine is called (step 632). A Commit protocol as used in the preferred electronic monetary system is described in U.S. application Ser. No. 08/427,287 and shown in FIG. 22. Session Manager X sends a "Ready-to-Commit" message to Y (steps 1702–1704). This passes the obligation to commit to the module receiving the message. In a conventional money transfer scenario, this technique of passing the burden of committing first is used to ensure that the party transferring money commits first, so as to eliminate the possibility of duplicating money.

Session Manager Y then sends an acknowledgment to X (steps 1706–1708) and commits to any outstanding transactions by updating its transaction log (step 1710). Also, if Y is a transaction money module, then To subscriber Y notifies the subscriber of the successful transaction (steps 1712–1714). Session Manager Y notes the end of the session (step 1716).

Tran Log X receives the acknowledgement from Y and updates its transaction log, thus committing to any outstanding transfers. X completes its commit in the same manner as Y (steps 1718–1724).

This flow diagram is still followed when money modules 6 are interacting with trusted agents 120 with the understanding that Send Message=Send E-Routed Message and that To Subscriber messages are actually sent encrypted to the trusted agent 120. With the foregoing in mind, money module B's MM Session Manager sends a "Ready-To-Commit" message to money module A's MM Session Manager via the send E-Routed Message subroutine (steps 1702–1704). MM Session Manager A then sends an "Acknowledgement" message to money module B and money module A commits (steps 1706–1716). When money module B receives the "Acknowledgement" message it too commits (steps 1718–1724).

During the commit routines of money modules A and B, they generate messages sent to their trusted agents A and B, respectively (steps 1714, 1722) informing them that they have committed to the transaction and hence that the payment was successful.

Referring again to FIG. 13, the money modules then both send the aforementioned "Payment Successful" messages to their trusted agents (steps 584-586). These messages are encrypted by session key (TA/MM). Session Manager A detects that a successful payment has been made and Ticket Holder A updates the receipt ticket with payment information such as the date of transaction (steps 588, 592, 634). Trusted agent A then commits (step 636) so that its retention of the ticket is no longer "provisional". Similarly, Session Manager B detects a successful payment (steps 590, 594) and trusted agent B commits (step 638). The transaction is now complete.

Referring back to FIG. 8, Ticket Holder A sends the commercial payment ticket to HTA (step 764). HTA receives the ticket and sends the ticket and remittance advice to the accounts payable system 189 as proof of payment (step 766). Ticket Holder B sends the commercial payment ticket to HTB (step 768). HTB receives the ticket and sends the ticket and remittance advice to the accounts receivable system 193 to match it with the outstanding invoices. Alternatively, this matching function could be performed during the payment transaction.

In this disclosure, there is shown and described the preferred embodiment of the invention, it being understood that the invention is capable of use in various other combinations and environments and is capable of changes or modifications within the scope of the inventive concepts as expressed herein.

I claim:

1. A system for electronic commercial payment comprising:

a customer trusted agent;

a first money module associated with said customer trusted agent that securely communicates with said customer trusted agent;

a merchant trusted agent that establishes a first secure session with said customer trusted agent by using cryptographic means;

a second money module associated with said merchant trusted agent that securely communicates with said merchant trusted agent, and that establishes a second secure session with said first money module by using cryptographic means;

where said customer trusted agent provides a remittance advice information signal to said merchant trusted agent, and said merchant trusted agent provides a commercial payment ticket signal to said customer trusted agent;

where upon receiving said commercial payment ticket signal, said customer trusted agent initiates a transfer of electronic money from said first money module to said second money module.

2. The system of claim 1, wherein said merchant trusted agent creates a digital signature over said remittance advice information and includes said digital signature in said commercial payment ticket signal.

3. The system of claim 2, where upon receiving said commercial payment ticket signal, said customer trusted agent verifies said digital signature prior to initiating said transfer of electronic money.

4. The system of claim 3, wherein said remittance advice information includes a list of invoices.

5. A method for electronic commercial payments utilizing a customer trusted agent, a first money module, a merchant trusted agent, and a second money module, comprising the steps of:

(a) establishing a first secure session between said customer trusted agent and said merchant trusted agent by using cryptographic means;

(b) said customer trusted agent transferring a remittance advice information signal, via said first secure session, to said merchant trusted agent;

(c) said merchant trusted agent creating a commercial payment ticket including, at least in part, data from said remittance advice information signal;

(d) said merchant trusted agent transferring a commercial payment ticket signal, via said first secure session, to said customer trusted agent which provisionally retains said ticket;

(e) establishing a second secure session between said first money module and said second money module by using cryptographic means;

(f) said first money module transferring an electronic money signal, via said second secure session, to said second money module which provisionally retains said electronic money;

(g) said first money module committing and securely informing said customer trusted agent of successful electronic money transfer;

(h) said second money module committing, whereupon said retention of said electronic money is no longer provisional, and securely informing said merchant trusted agent of successful electronic money receipt;

(i) said customer trusted agent committing, whereupon said retention of said commercial payment ticket is no longer provisional; and (j) said merchant trusted agent committing.

6. The method of claim 5, wherein said merchant trusted agent creates a digital signature over said remittance advice information and includes said digital signature in said commercial payment ticket signal.

7. The method of claim 6 further including the step of said customer trusted agent verifying said digital signature prior to initiating said transfer of electronic money.

8. A system for securely linking electronic commercial payment to remittance advice information over a communication network, comprising:

a tamper-proof first electronic agent having a first processor;

a tamper-proof first money module associated with and that securely communicates with said first electronic agent, and having a second processor;

a tamper-proof second electronic agent that established a first secure session with said first electronic agent over said communication network by using cryptographic means, and having a third processor;

a tamper-proof second money module associated with and that securely communicates with said second electronic agent, and that establishes a second secure session with said first money module by using cryptographic means, and having a fourth processor;

where said first processor is adapted to transfer a remittance advice information signal, via said first secure session, to said second electronic agent;

where said third processor creates a commercial payment ticket based on said remittance advice information, and transfers a commercial payment ticket signal to said first electronic agent via said first secure session;

where upon verifying said commercial payment ticket, said first processor institutes an electronic money payment from said first money module to said second money module.

9. The commercial payment system of claim 8, wherein said third processor forms a digital signature over said remittance advice information, and includes said digital signature in said commercial payment ticket signal.

10. The commercial payment system of claim 9, wherein said remittance advice information includes a list of invoices.

11. The commercial payment system of claim 10, wherein amounts associated with invoices of said list are summed and compared to a total amount included in said remittance advice information.

12. A system for securely linking electronic commercial payment to remittance advice information, comprising:

a tamper-proof first electronic transaction device including a first processor;

a tamper-proof second electronic transaction device including a second processor and that communicates with said first electronic transaction device via a secure session established by using cryptographic means;

where said first processor is adapted to transfer a remittance advice information signal including a list of invoices to said second electronic transaction device;

where said second processor digitally signs at least part of said remittance advice information and incorporates said digital signature in a commercial payment ticket;

where said second processor transfers a commercial payment ticket signal to said first electronic transaction device; and where said first electronic transaction device transfers an electronic money signal to said second electronic transaction device, thereby completing a final payment from payor to payee without third party intermediaries.

13. The commercial payment system of claim 12, wherein said commercial payment ticket is sent to a computer-implemented accounts payable system as proof of payment.

14. The commercial payment system of claim 12, wherein said second electronic transaction device sends said remittance advice information to a computer-implemented accounts receivable system to match with outstanding invoices.

15. The commercial payment system of claim 12, wherein said first electronic transaction device verifies said digital signature prior to initiating said transfer of electronic money.

16. The commercial payment system of claim 12, wherein said first electronic transaction device checks the validity of an electronic merchant credential associated with said second electronic transaction device.

* * * * *